United States Patent
Matsumoto

(10) Patent No.: US 8,814,207 B2
(45) Date of Patent: Aug. 26, 2014

(54) INSTRUMENT PANEL INTEGRALLY INCLUDING AN AIRBAG DOOR

(75) Inventor: Akinori Matsumoto, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/114,976

(22) PCT Filed: May 24, 2011

(86) PCT No.: PCT/JP2011/061904
§ 371 (c)(1),
(2), (4) Date: Oct. 31, 2013

(87) PCT Pub. No.: WO2012/160656
PCT Pub. Date: Nov. 29, 2012

(65) Prior Publication Data
US 2014/0077481 A1    Mar. 20, 2014

(51) Int. Cl.
*B60R 21/205* (2011.01)
*B60R 21/2165* (2011.01)

(52) U.S. Cl.
CPC .......... *B60R 21/205* (2013.01); *B60R 21/2165* (2013.01)
USPC ...................................... 280/732; 280/728.3

(58) Field of Classification Search
CPC .......................... B60R 21/205; B60R 21/2165
USPC .................... 280/728.2, 732, 728.3
See application file for complete search history.

(56) References Cited

U.S. PATENT DOCUMENTS

| | | | |
|---|---|---|---|
| 5,698,283 | A | 12/1997 | Yamasaki et al. |
| 5,989,479 | A | 11/1999 | Yamasaki et al. |
| 6,065,771 | A | 5/2000 | Kawakubo et al. |
| 7,556,285 | B1 | 7/2009 | Hayashi |
| 2009/0230660 | A1 | 9/2009 | Ohgo et al. |

FOREIGN PATENT DOCUMENTS

| | | |
|---|---|---|
| DE | 19505214 A1 | 8/1996 |
| DE | 10020525 A1 | 10/2001 |
| DE | 10061093 C1 | 4/2002 |
| EP | 0749872 A2 | 12/1996 |
| EP | 2100781 A1 | 9/2009 |
| GB | 2298169 A | 8/1996 |
| JP | A-06-199200 | 7/1994 |
| JP | A-10-329631 | 12/1998 |
| JP | A-11-245756 | 9/1999 |
| JP | A-2003-200804 | 7/2003 |
| JP | A-2004-026053 | 1/2004 |
| JP | A-2006-082791 | 3/2006 |
| JP | A-2008-105572 | 5/2008 |
| JP | A-2009-184518 | 8/2009 |
| JP | A-2009-220633 | 10/2009 |

*Primary Examiner* — Ruth Ilan
(74) *Attorney, Agent, or Firm* — Oliff PLC

(57) ABSTRACT

In this instrument panel, a groove portion for forming an intended splitting portion in the door main body portion of the airbag door is formed at a cover layer side of the door main body portion. Therefore, when the door main body portion inverts from the recessed shape to a protruding shape due to inflation pressure of an airbag, the groove portion is stretched in the curvature direction of the door main body portion. As a result, stress arising at the intended splitting portion is dispersed, and splitting of the intended splitting portion before the door main body portion has completely inverted to the protruding shape is prevented. Therefore, unintended interference between a front side door portion and a rear side door portion may be prevented.

8 Claims, 18 Drawing Sheets

INSTRUMENT PANEL INTEGRALLY INCLUDING AN AIRBAG DOOR

TECHNICAL FIELD

The present invention relates to an instrument panel of a vehicle, and particularly relates to an instrument panel integrally including an airbag door that is a structural member of an airbag device for a passenger seat.

BACKGROUND ART

In an instrument panel of a type with an integral airbag door, which is illustrated in the below-cited Patent Document 1, a cross-sectional shape of a door main body portion (i.e., a portion that excludes strut portions) of an airbag lid (an airbag door) as viewed in a vehicle front-and-rear direction is formed in a recessed shape that curves so as to recess toward the lower side. An "H"-shaped tear line portion (a portion intended to split open) is formed in the door main body portion. Thus, the front and rear of the airbag door (door portions) are formed to be partitioned. In addition, a pair of front and rear hinge line portions are formed at the door main body portion. This door main body portion is subject to inflation pressure of an airbag and the intended splitting portion splits open. Hence, the front and rear door portions open up to a vehicle cabin side thereof about the pair of hinge line portions. These hinge line portions curve in accordance with the curved shape of the door main body portion. The door main body portion is formed with a greatly reduced thickness at a central portion that excludes two end portions of the hinge line portions, and the two end portions of the hinge line portions are formed as increased thickness portions. Thus, a large splitting resistance (opening resistance) of the door portions when the airbag is inflating and expanding is avoided.

Patent Document 1: Japanese Patent Application Laid-Open (JP-A) No. 2003-200804

DISCLOSURE OF INVENTION

Technical Problem

In the integral airbag door-type instrument panel described above, the hinge line portions of the door main body portion curve greatly. Even if the hinge line portions are not greatly curved, opening resistance of the door portions may be large. For example, the instrument panel may have a structure in which a cross-sectional shape of the door main body portion of the airbag door as viewed in a vehicle width direction is formed in a recessed shape that curves so as to recess toward the opposite side thereof from the vehicle cabin, and in which the door portion at one side in the direction of curvature and the door portion at the other side in the direction of curvature open to the vehicle cabin side about hinge line portions at the sides of two ends in the direction of curvature. In this structure, when the door main body portion receives inflation pressure of the airbag and inverts (deforms) from the recessed shape to a protruding shape, opening paths of the curvature direction one side door portion and the curvature direction other side door portion may interfere with one another. Thus, there is room for improvement in the matter of making opening performance excellent.

In consideration of the situation described above, an object of the present invention is to provide an instrument panel integrally including an airbag door that may make door opening performance excellent even when a cross-sectional shape of a door main body portion of the airbag door as viewed in a vehicle width direction is curved so as to recess toward the opposite side thereof from a vehicle cabin, and a door portion at one side in the direction of curvature and a door portion at the other side in the direction of curvature open to the vehicle cabin side thereof about hinge line portions at the sides of two ends in the direction of curvature.

Solution to Problem

An instrument panel integrally including an airbag door according to the invention as recited in claim 1 includes: a base member in which an aperture portion is formed; an airbag door that covers the aperture portion with a door main body portion that is attached to the base member, a cross-sectional shape of the door main body portion as viewed in a vehicle width direction being formed in a recessed shape that curves such that a vehicle cabin side thereof is recessed; a cover layer that is formed as a layer along surfaces of the base member and the door main body portion, the cover layer forming a concave design surface that curves so as to recess toward the opposite side thereof from the vehicle cabin; a pair of hinge portions formed at each of two curvature direction end sides of the door main body portion; and an intended splitting portion that is formed in a reduced thickness form in the door main body portion by a groove portion being formed at the side of the door main body portion at which the cover layer is provided, the intended splitting portion partitioning the door main body portion into at least a curvature direction one side door portion and a curvature direction other side door portion, and the intended splitting portion splitting together with the cover layer when the curvature direction one side door portion and the curvature direction other side door portion receive, from the opposite side thereof from the vehicle cabin, inflation pressure of an airbag and open toward the vehicle cabin side thereof about the pair of hinge portions.

In the instrument panel integrally including an airbag door recited in the first aspect, the aperture portion formed in the base member is closed off by the door main body portion of the airbag door. The cross-sectional shape of the door main body portion as viewed in the vehicle width direction is formed in the recessed shape that is curved so as to be recessed to the opposite side thereof from the vehicle cabin. The cover layer is formed as a layer over surfaces of the base member and the door main body portion, and forms a concave design surface that is curved such that the cover layer is recessed from the vehicle cabin side thereof. The pair of hinge portions are formed at the sides of the two curvature direction ends of the door main body portion, and the intended splitting portion is formed in the reduced thickness form by the groove portion being formed in the cover layer side (vehicle cabin side) of the door main body portion. The intended splitting portion partitions the door main body portion into at least the curvature direction one side door portion and the curvature direction other side door portion. These door portions are opened to the vehicle cabin side about the pair of hinge portions by the inflation pressure of the airbag being applied to the door portions (the door main body portion) from the opposite side to the vehicle cabin side thereof and the intended splitting portion splitting open along with the cover layer. Hence, the airbag may inflate and expand toward the vehicle cabin side through the aperture portion of the base member.

Now, when the inflation pressure of the airbag is applied to the door main body portion as mentioned above, the door main portion inverts (deforms) from the above-mentioned recessed shape to a protruding shape. At this time, the groove portion formed at the cover layer side (vehicle cabin side) of the door main body portion is stretched in the curvature direction of the door main body portion. Thus, stress arising at the intended splitting portion may be dispersed. Therefore, splitting of the intended splitting portion before the door main body portion has fully inverted to the protruding shape may be prevented or effectively inhibited. That is, if an intended splitting portion splits before a door main body portion has fully inverted to a protruding shape, a curvature direction one side door portion and curvature direction other side door portion that are connected via this intended splitting portion may interfere with one another. However, according to the present invention, this may be avoided. Thus, door opening performance may be made excellent.

In an instrument panel integrally including an airbag door recited in the second aspect, in the instrument panel integrally including an airbag door recited in the first aspect, the cover layer includes a skin and a foam layer that is foam molded between the skin and the base member and door main body portion, and an incision portion is formed in the intended splitting portion, the incision portion being incised from the opposite side of the intended splitting portion from the side thereof at which the cover layer is provided, to a depth that does not reach a surface of the skin.

In the instrument panel integrally including an airbag door recited in the second aspect, the cover layer includes the skin and the foam layer that is foam molded between the skin and the base member and door main body portion. The incision portion is formed in the intended splitting portion of the door main body portion, being incised from the opposite side from the side at which the cover layer is provided, with a depth that does not reach the surface of the skin. Hence, during the inflation of the airbag, the intended splitting portion and the skin may be split excellently. Thus, door opening performance may be even further improved. Moreover, because the incision portion does not reach the surface of the skin that structures the concave design surface, external appearance quality of the concave design surface may be made excellent.

In an instrument panel integrally including an airbag door recited in the third aspect, in the instrument panel integrally including an airbag door recited in the second aspect, the incision portion is formed by laser machining.

In the instrument panel integrally including an airbag door recited in the third aspect, the incision portion, which is incised in the intended splitting portion of the door main body portion to the depth that does not reach the surface of the skin from the opposite side from the cover layer, is formed by laser machining. Therefore, management of a remaining thickness of the skin may be conducted with ease even after foam molding of the foam layer between the skin and the base member and door main body portion, and the incision portion may be prevented from emerging at the concave design surface side. Thus, avoiding problems with the external appearance of the concave design surface and assuring door opening performance may both be achieved with ease.

In an instrument panel integrally including an airbag door recited in the fourth aspect, in the instrument panel integrally including an airbag door recited in any one of the first to third aspects, the airbag door includes a door side wall portion that protrudes in a frame shape to a rear face side of the base member and to which a module case of an airbag module is joined.

In the instrument panel integrally including an airbag door recited in the fourth aspect, the airbag door includes the door side wall portion that extends in a frame shape to the rear face side of the base member, and the module case of the airbag module is joined to the door side wall portion. Therefore, a reaction force that is inputted to the module case when the airbag is inflating and expanding may be excellently supported by the door side wall portion.

In an instrument panel integrally including an airbag door recited in the fifth aspects, in the instrument panel integrally including an airbag door recited in the fourth aspect, the door side wall portion is formed as a separate body from the door main body portion and is attached to the base member.

In the instrument panel integrally including an airbag door recited in the fifth aspect, the door main body portion and door side wall portion of the airbag door are formed as separate bodies (the components are divided). Therefore, when a weakened portion (a tear line portion) such as the incision portion recited in the second aspect is being formed in the door main body portion and the cover layer, restriction of a range of specification of the tear line by the door side wall portion may be avoided by this operation being carried out before the door side wall portion is attached to the base member. That is, if, for example, the incision portion recited in the second aspect were being formed by the laser machining recited in the third aspect, a range of movement of the laser oscillator would be restricted by the door side wall portion, and thus the range of specification of the tear line portion would be restricted, as a result of which it might be difficult to improve door opening performance. However, the range of specification of the tear line portion may be extended by this configuration of the present invention. Thus, this is excellent for improving door opening performance.

In an instrument panel integrally including an airbag door recited in the sixth aspect, in the instrument panel integrally including an airbag door recited in the fifth aspect, a main body side flange portion is provided at the door main body portion, a side wall side flange portion is provided at the door side wall portion, and the main body side flange portion and the side wall side flange portion are fixed by fastening to the base member in a state in which the base member is sandwiched between the main body side flange portion and the side wall side flange portion.

In the instrument panel integrally including an airbag door recited in the sixth aspect, in the state in which the base member is sandwiched between the main body side flange portion provided at the door main body portion of the airbag door and the side wall side flange portion provided at the door side wall portion, these parts are fixed together by fastening. Thus, the base member may be reinforced by these flange portions, and deformation of the base member when the airbag is inflating and expanding may be suppressed.

In an instrument panel integrally including an airbag door recited in the seventh aspect, the instrument panel integrally including an airbag door recited in the sixth aspect further includes a metal plate member that is superposed with the main body side flange portion at the opposite side thereof from the side at which the base member is disposed, wherein a plural number of stud bolts are mounted at the metal plate member, the plural number of stud bolts penetrating through the main body side flange portion, the base member and the side wall side flange portion and being screwed into a plural number of nuts.

In the instrument panel integrally including an airbag door recited in the seventh aspect, the plural stud bolts are mounted at the metal plate member that is superposed with the door main body portion at the opposite side thereof from the base member. Therefore, when the main body side flange portion of the door main body portion, the base member and the side wall side flange portion of the door side wall portion are being fixed together by fastening, the plural stud bolts may be treated as an integral body, and an operation of fixing by fastening may be made simple. In addition, the surroundings of the portions that are fixed by fastening may be reinforced by the metal plate member. Therefore, deformation of the base member when the airbag is inflating and expanding may be more excellently suppressed.

In an instrument panel integrally including an airbag door recited in the eighth aspect, the instrument panel integrally including an airbag door recited in any one of the fourth to seventh aspects further includes: an ornamental member that is disposed adjacent to the curvature direction one side relative to the door main body portion, and that is attached to the base member by a clip; and a reinforcement bracket that is disposed abutting against a face of the door side wall portion at the side thereof at which the ornamental member is disposed, the reinforcement bracket being fixed by fastening to the base member and the airbag door.

In the instrument panel integrally including an airbag door recited in the eighth aspect, the ornamental member is disposed adjacent to the curvature direction one side of the door main body portion, and the ornamental member is attached to the base member by clips. Hence, the ornamental member may detach from the base member if the surroundings of the clips at the base member are permanently deformed by an input force when the door main body portion is switching from the recessed shape to the protruding shape due to the inflation pressure of the airbag. Accordingly, in the present invention the reinforcement bracket is provided, which is disposed abutting against the face of the door main body portion at the ornamental member side thereof and which is fixed by fastening to the base member and the airbag door. Thus, deformation of the base member may be suppressed, and detachment of the ornamental member as described above may be prevented or effectively inhibited.

Advantageous Effects of Invention

As described hereabove, in the instrument panel integrally including an airbag door relating to the present invention, even in the case of a structure in which the cross-sectional shape of the door main body portion of the airbag door as viewed in the vehicle width direction is formed in a recessed shape that curves so as to be recessed toward the opposite side thereof from the vehicle cabin and the curvature direction one side door portion and curvature direction other side door portion provided at the door main body portion open about the hinge portions at the two curvature direction end sides, door opening performance may be made excellent.

BEST MODE FOR CARRYING OUT THE INVENTION

First Exemplary Embodiment

Figure 1:
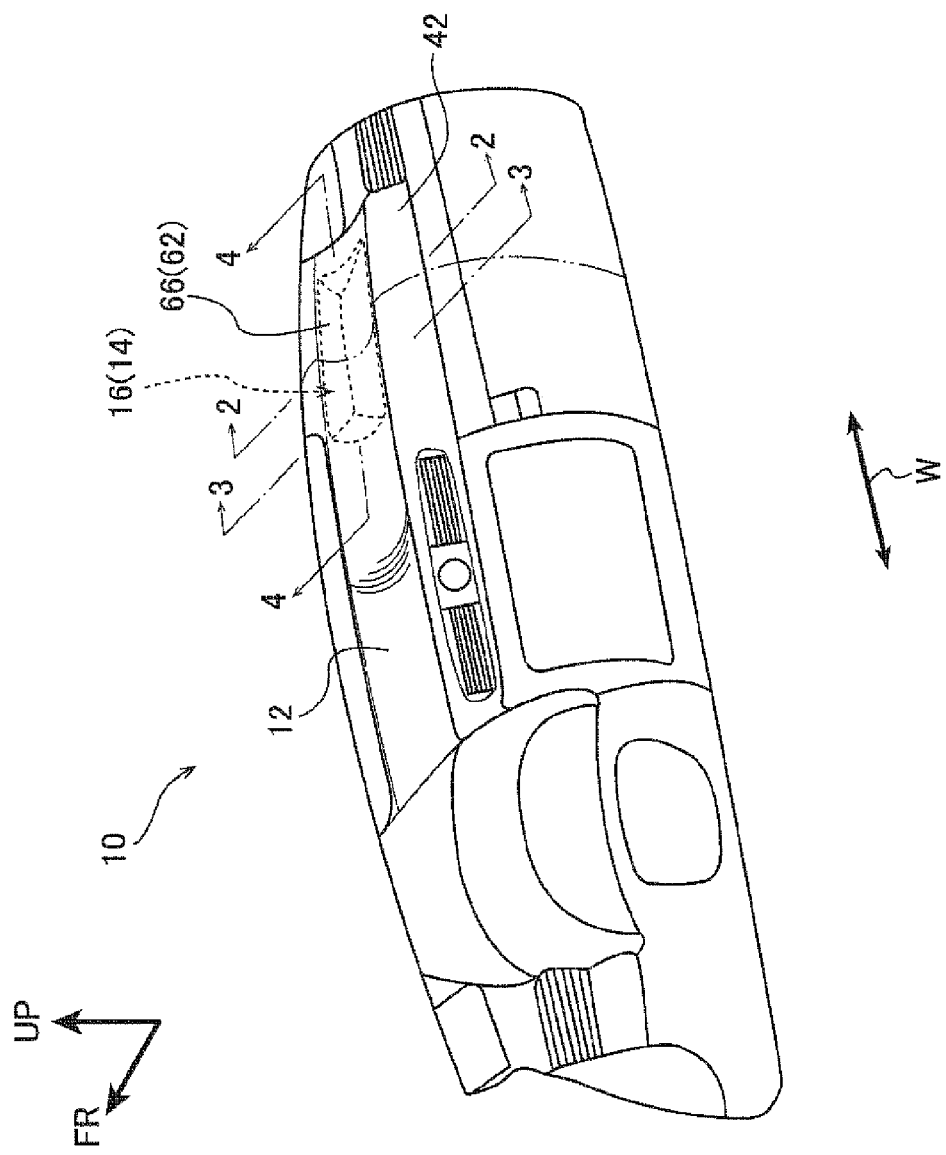
FIG. 1 is a perspective view of an instrument panel integrally including an airbag door in accordance with a first exemplary embodiment of the present invention.

Herebelow, an instrument panel integrally including an airbag door 10 in accordance with the first exemplary embodiment of the present invention (hereinafter referred to simply as "the instrument panel 10") is described using FIG. 1 to FIG. 22. An arrow FR that is shown where appropriate in the drawings indicates a vehicle forward direction, an arrow UP indicates a vehicle upward direction, and an arrow W indicates a vehicle width direction.

As shown in FIG. 1, a portion of an upper face of the instrument panel 10 according to the present exemplary embodiment is a concave design surface 12. This concave design surface 12 extends in a vehicle width direction from a vehicle width direction central portion to a right end vicinity of an upper face of the instrument panel 10. A cross-sectional shape of the concave design surface 12 as viewed in the vehicle width direction is curved so as to recess toward the lower side (the opposite side thereof from the vehicle cabin). An airbag door 16, which is a structural member of an airbag device for a passenger seat 14, is integrally incorporated in the instrument panel 10 at a portion thereof opposing the concave design surface 12. The airbag door 16 is a door of what is known as an invisible type. Below, structures peripheral to the airbag door 16 of the instrument panel 10 are described.

Figure 2:
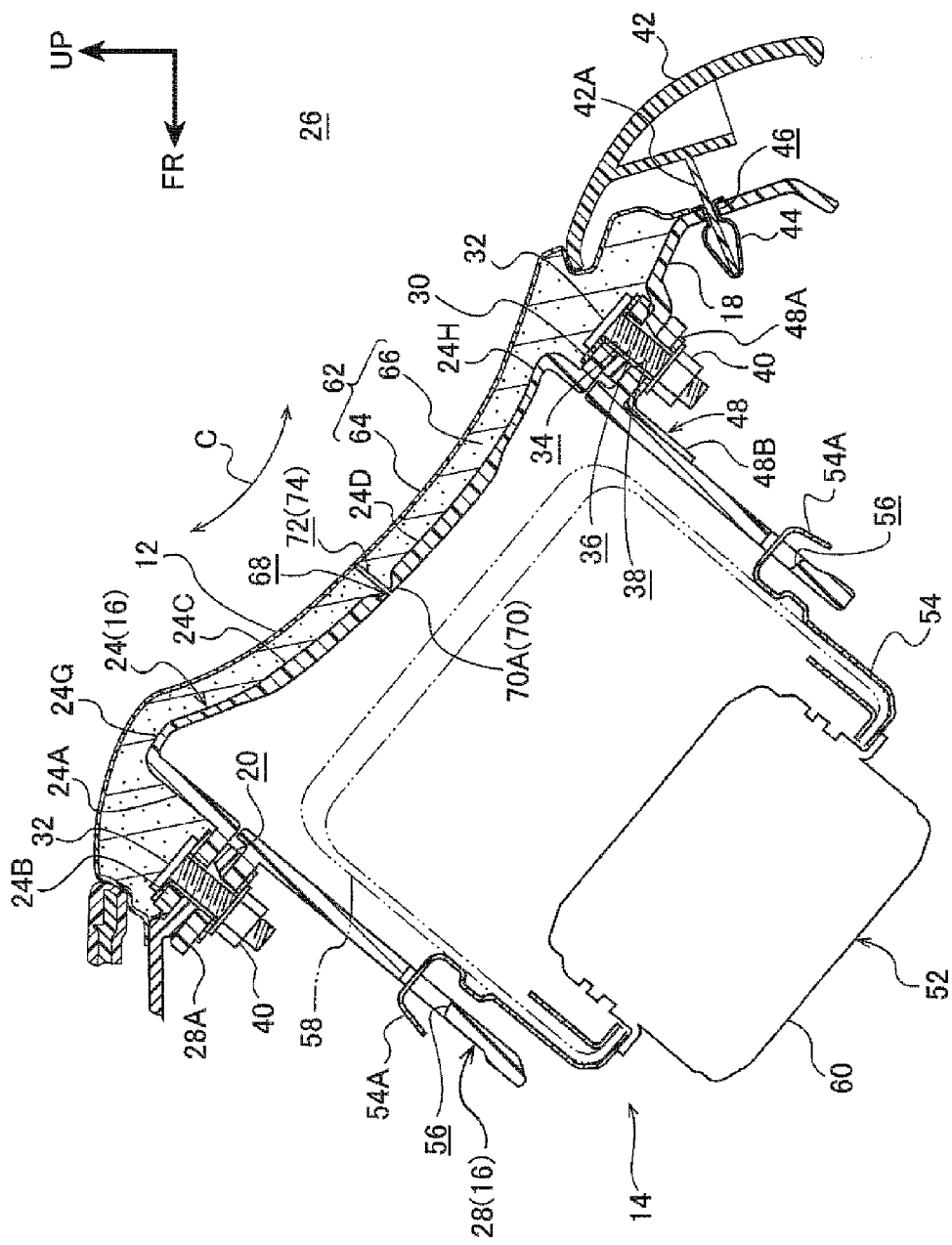
FIG. 2 is a magnified sectional view showing a section cut along line 2-2 in FIG. 1.
Figure 3:
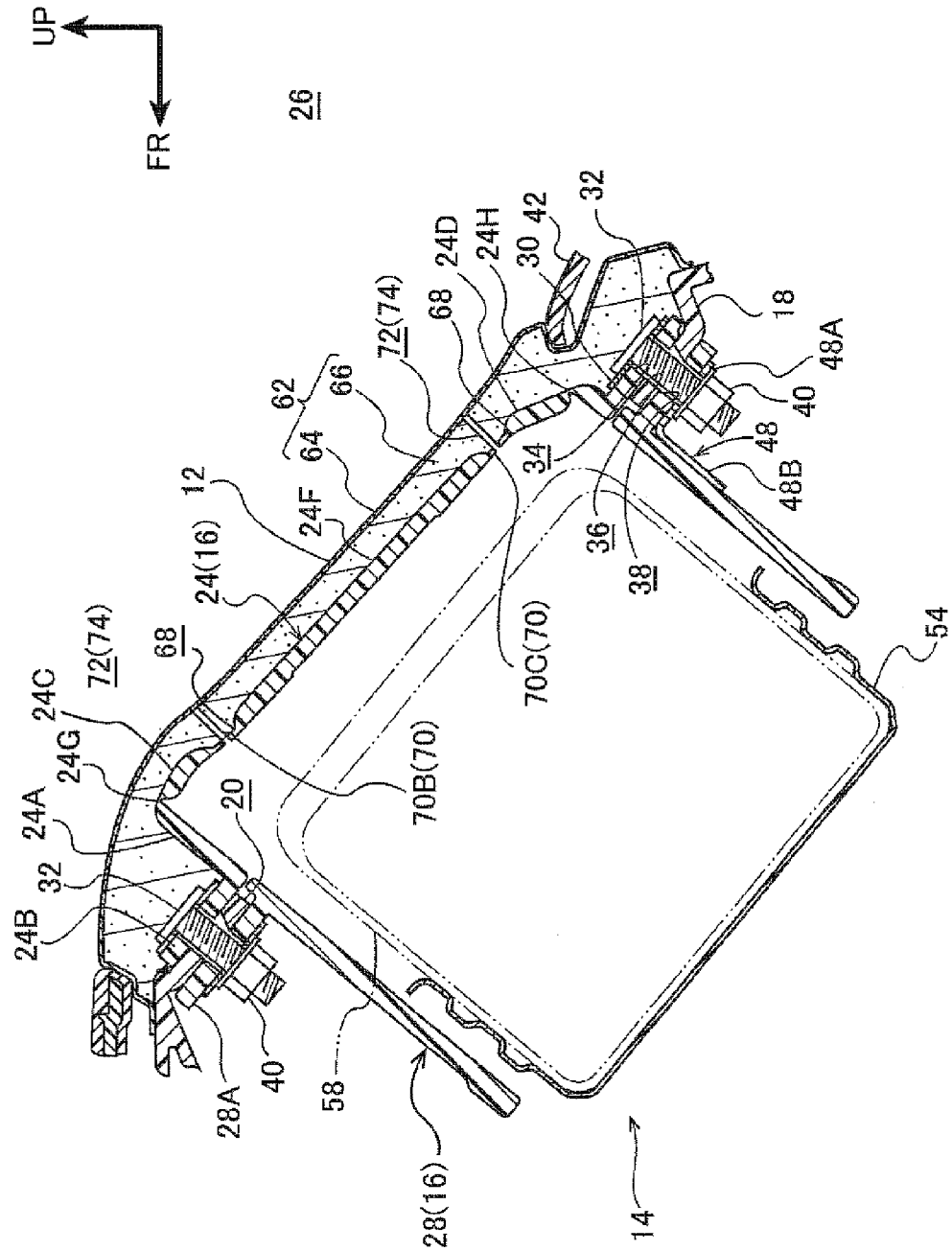
FIG. 3 is a magnified sectional view showing a section cut along line 3-3 in FIG. 1.
Figure 4:
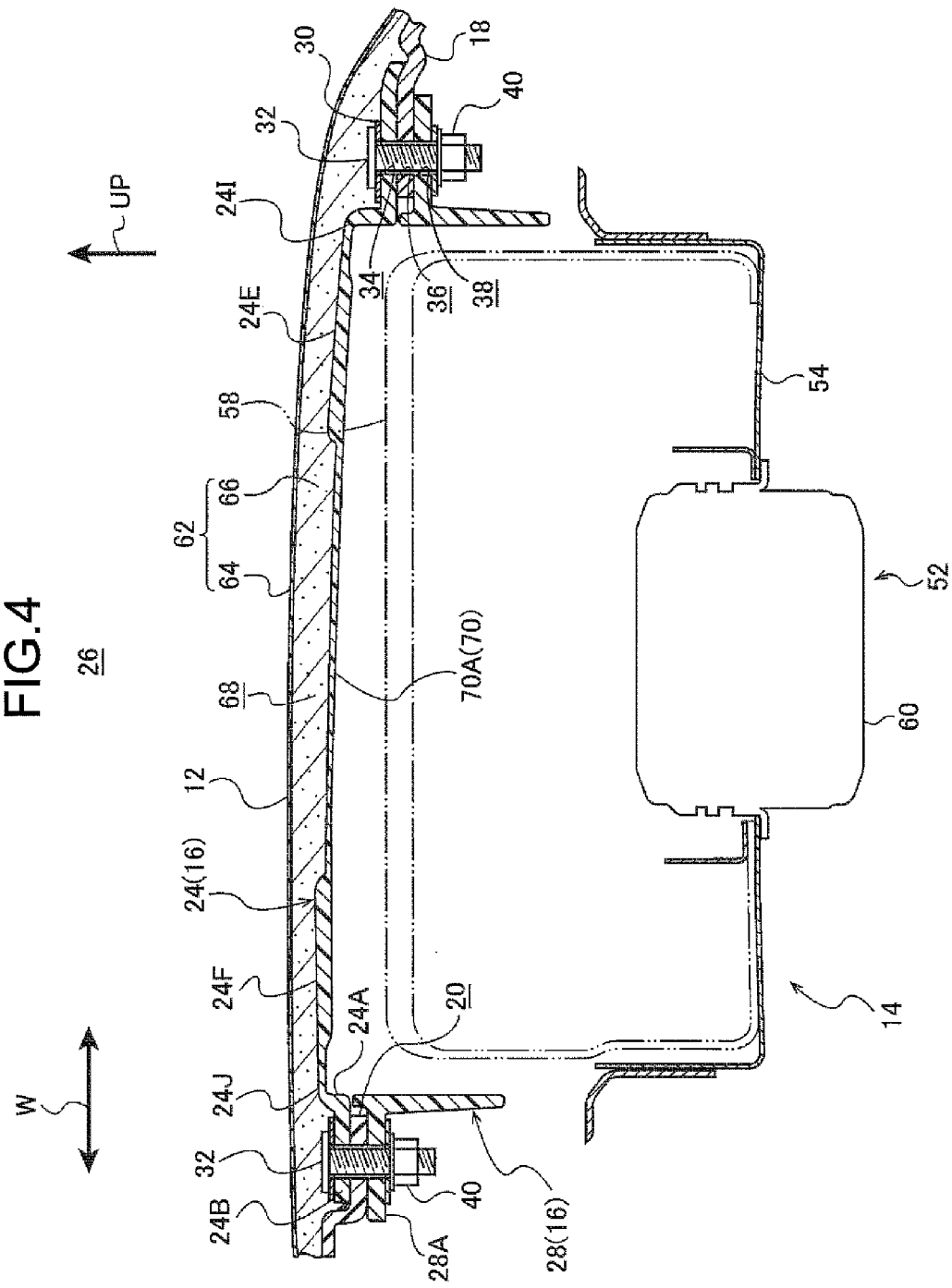
FIG. 4 is a magnified sectional view showing a section cut along line 4-4 in FIG. 1.

As shown in FIG. 2 to FIG. 4, the instrument panel 10 is provided with a base member 18 made of resin. A rectangular aperture portion 20 formed in the base member 18 is closed off by a door main body portion 24 of the airbag door 16. The door main body portion 24 is formed in a substantially rectangular shape of a synthetic resin material, and is disposed at the upper side (the side of a vehicle cabin 26) of the base member 18 in a state of opposing the aperture portion 20. As shown in FIG. 2, the door main body portion 24 is formed in a recessed shape of which a cross-sectional shape as viewed in the vehicle width direction curves so as to recess toward the lower side (the opposite side thereof from the vehicle cabin 26). The arrow C in FIG. 2 shows the curvature direction of the door main body portion 24. A frame shape portion 24A is provided at periphery edge portions of the door main body portion 24. The frame shape portion 24A protrudes in a frame shape toward the base member 18 side of the door main body portion 24. A main body side flange portion 24B protrudes from a lower end of the frame shape portion 24A to the outer side of the outer periphery of the frame shape portion 24A. The main body side flange portion 24B is superposed with a front face of the base member 18 at a periphery edge portion of the aperture portion 20.

The airbag door 16 further includes a door side wall portion 28 that is disposed at a rear side of the base member 18. The door side wall portion 28 is formed in a square tube shape of a synthetic resin material, and is formed as a separate body from the door main body portion 24. That is, in the airbag door 16, the door main body portion 24 and the door side wall portion 28 are divided as components. The door side wall portion 28 extends in a frame shape from the periphery edge portion of the aperture portion 20 to the rear side of the base member 18. A side wall side flange portion 28A extends from an end portion of the door side wall portion 28 at the base member 18 side thereof to the outer side of the outer periphery of the door side wall portion 28. The side wall side flange portion 28A is superposed with the rear face of the base member 18 at the periphery edge portion of the aperture portion 20. Thus, the base member 18 is sandwiched between the side wall side flange portion 28A and the main body side flange portion 24B.

A metal plate member 30 is formed in a frame shape of a plate metal material. The metal plate member 30 is superposed with the main body side flange portion 24B at the opposite side thereof from the side at which the base member 18 is disposed. A plural number of stud bolts 32 are fixed to the metal plate member 30, in rows in peripheral directions. The stud bolts 32 penetrate through penetration holes 34 formed in the main body side flange portion 24B, penetration holes 36 formed in the base member 18 and penetration holes 38 formed in the side wall side flange portion 28A. Nuts 40, which are disposed at the opposite side of the side wall side flange portion 28A from the side thereof at which the base member 18 is disposed, are screwed onto the stud bolts 32. Thus, the door main body portion 24 and the door side wall portion 28 are fixed by fastening to the base member 18.

As shown in FIG. 1 and FIG. 2, an ornamental member 42 (a decorative member) is disposed adjacent to the door main body portion 24 at one curvature direction side of the door main body portion 24 (the vehicle rearward side in this case). As shown in FIG. 1, the ornamental member 42 is formed in a long, narrow shape along the vehicle width direction, and extends from the vehicle width direction central portion to the right end vicinity of the instrument panel 10. A plural number of strut portions 42A (see FIG. 2) are provided at the ornamental member 42. The strut portions 42A protrude towards the side thereof at which the base member 18 is disposed. The strut portions 42A are inserted, together with clips 44 made of metal, into anchoring holes 46 formed in the base member 18, and are anchored at the base member 18 by the clips 44.

Figure 5:
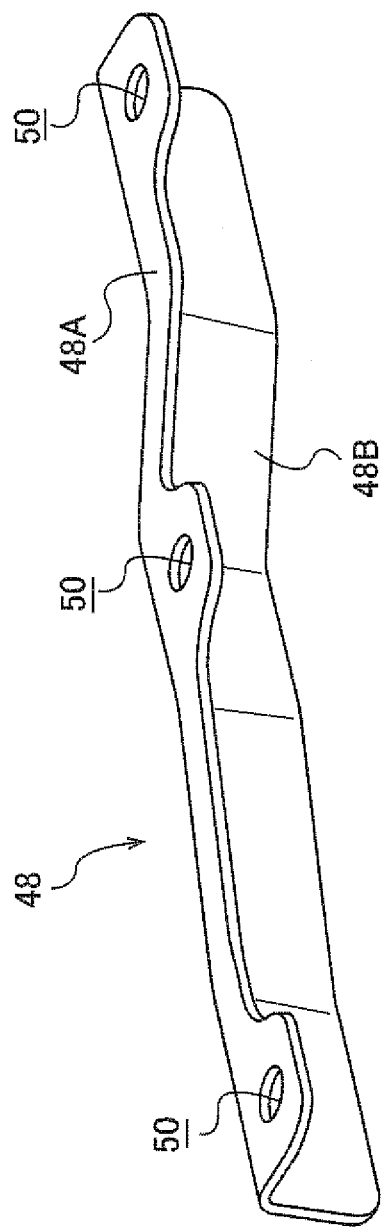
FIG. 5 is a perspective view of a reinforcement bracket in accordance with the first exemplary embodiment of the present invention.

A reinforcement bracket 48 is disposed at the side of the door side wall portion 28 at which the ornamental member 42 is disposed (the rear end side). As shown in FIG. 5, the reinforcement bracket 48 is formed of a plate metal material in a long, narrow shape with an "L" shape in cross section, and is arranged along the vehicle width direction. The reinforcement bracket 48 is provided with a fastening portion 48A, which is superposed with a lower face of the side wall side flange portion 28A. A plural number (three in this case) of penetration holes 50 are formed in the fastening portion 48A. Of the above-mentioned plural stud bolts 32, three of the stud bolts 32 that are disposed at the rear end side of the door side wall portion 28 penetrate through the penetration holes 50. These stud bolts 32 are screwed into the respective nuts 40. Thus, the fastening portion 48A is fixed by fastening to the side wall side flange portion 28A, the base member 18 and the main body side flange portion 24B. A reinforcement portion 48B extends from a front end portion (one width direction end portion) of the fastening portion 48A to the opposite side of the fastening portion 48A from the side thereof at which the side wall side flange portion 28A is disposed. The reinforcement portion 48B abuts against a rear face (side face) of the door side wall portion 28 in a state of area contact.

An airbag module 52 is disposed at a lower end side of the door side wall portion 28. The airbag module 52 is provided with a module case 54 in a substantial box shape. The module case 54 is supported, via a bracket, at a reinforcing member such as an instrument panel reinforcement or the like, which is not shown in the drawings. A plural number of anchoring portions 54A are provided at front and rear walls of the module case 54. The anchoring portions 54A are formed in hook shapes. The anchoring portions 54A hook into a plural number of attachment apertures 56 that are formed in the door side wall portion 28. Thus, the module case 54 is joined to the door side wall portion 28, and the airbag module 52 is supported at the base member 18 via the door side wall portion 28. The airbag module 52 is provided with an airbag 58 and an inflator 60. The airbag 58 is disposed at the inner side of the door side wall portion 28 in a folded condition. The inflator 60 is a gas generation device. A front airbag sensor, which is not shown in the drawings, is disposed at a predetermined position of a front portion of the vehicle body, and a center airbag sensor, which is not shown in the drawings, is provided at a central portion of the vehicle cabin. When a frontal collision state is detected by the front airbag sensor and center airbag sensor, the inflator 60 is actuated by an electronic control unit (ECU), which is not shown in the drawings, and jets gas out into the airbag 58. As a result, the airbag 58 inflates toward the side thereof at which the door main body portion 24 is disposed. The airbag module 52 described above is an ordinary module and is not a necessary element of the present exemplary embodiment. Accordingly, the airbag module 52 is schematically illustrated in FIG. 2 to FIG. 4, FIG. 14 to FIG. 17, and FIG. 22.

A cover layer 62 is formed as a layer at the surface side of the door main body portion 24 and the base member 18. The cover layer 62 is structured by a skin 64 and a urethane foam layer 66 (a foam layer). The skin 64 is made of resin and structures a design surface of the instrument panel 10. The urethane foam layer 66 is foam molded between the skin 64 and the door main body portion 24 and base member 18. The cover layer 62 is formed along the surface of the door main body portion 24 and the base member 18, and the aforementioned concave design surface 12 is formed by the skin 64.

Figure 6:
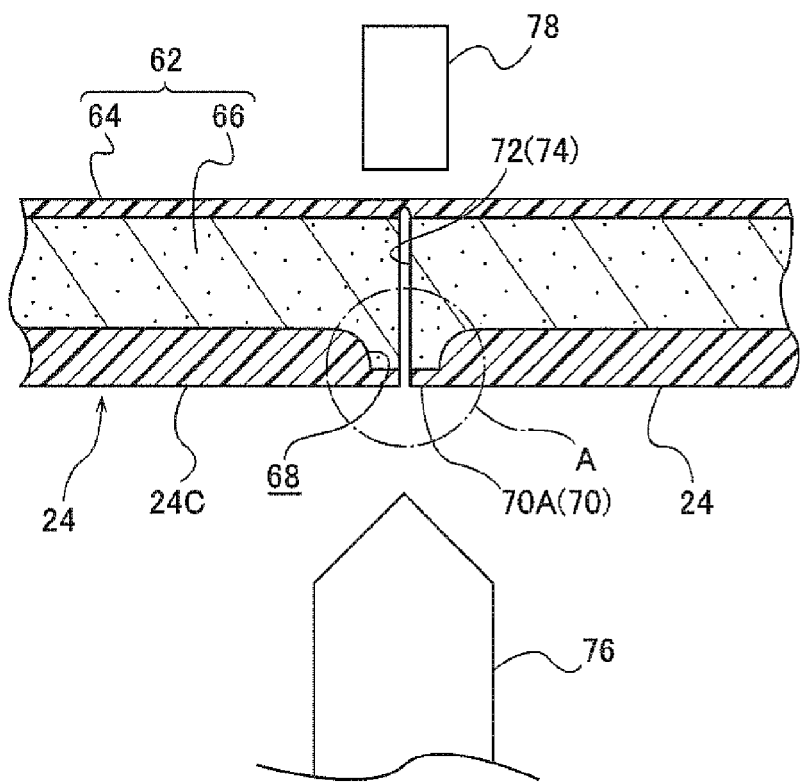
FIG. 6 is a magnified sectional view showing a magnification of a portion of FIG. 2, and is a view for describing a process for forming an incision portion by laser machining.
Figure 8:
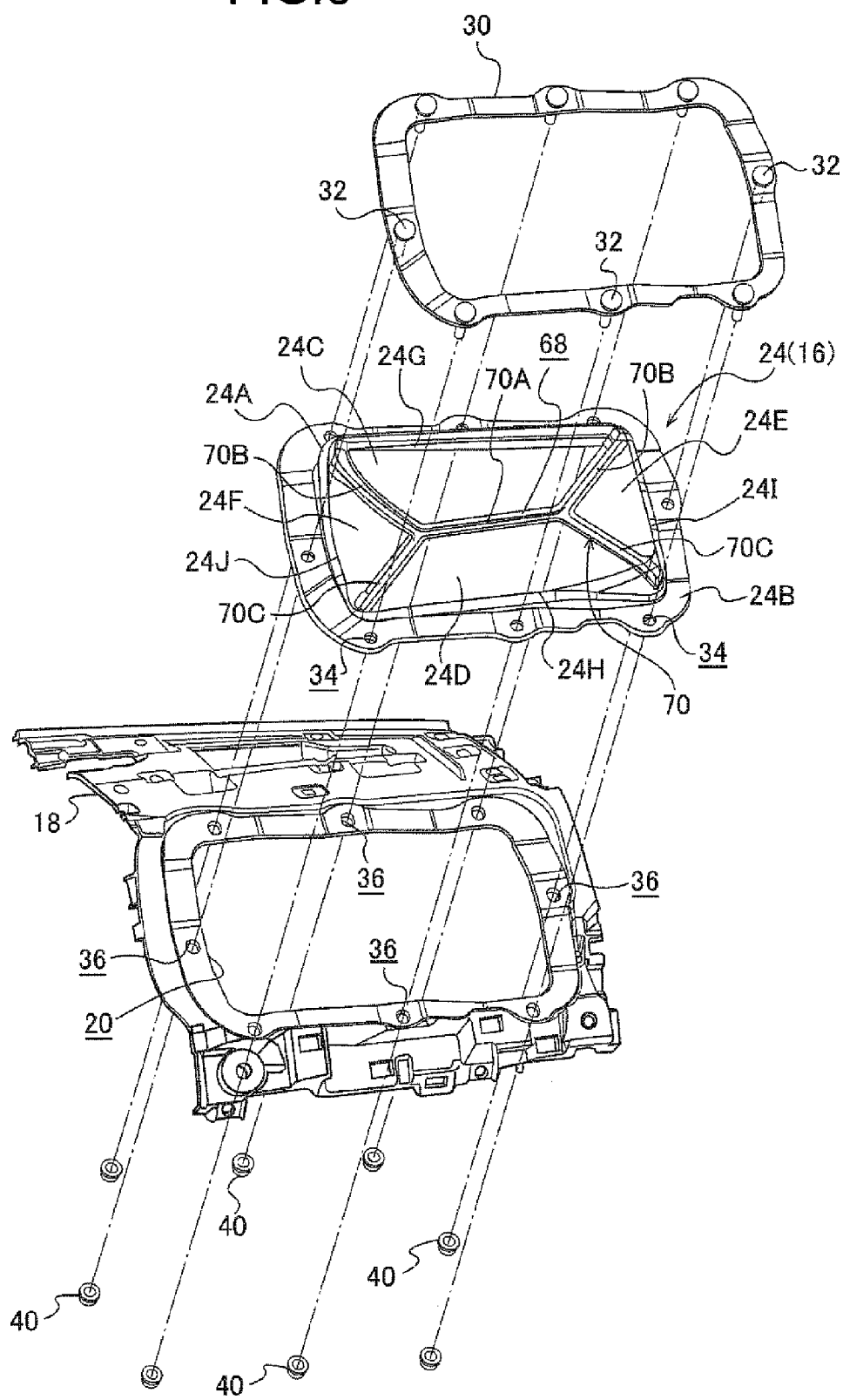
FIG. 8 is an exploded perspective view for describing a first step of a fabrication procedure of the instrument panel integrally including an airbag door in accordance with the first exemplary embodiment of the present invention.

A groove portion 68 is formed in the door main body portion 24, in the face at the side thereof at which the cover layer 62 is disposed (the vehicle cabin 26 side). As shown in FIG. 6, the groove portion 68 is formed in a trapezoid shape in cross section. Portions of the door main body portion 24 at which the groove portion 68 is formed serve as an intended splitting portion 70 with a reduced thickness form. As shown in FIG. 8, the intended splitting portion 70 is a structured by a laterally extending portion 70A, a pair of left and right forward extending portions 70B, and a pair of left and right rearward extending portions 70C. The laterally extending portion 70A extends in the vehicle width direction at a curvature direction central portion of the door main body portion 24. The forward extending portions 70B extend toward the vehicle forward side and the vehicle width direction outer side from each of two end portions of the laterally extending portion 70A. The rearward extending portions 70C extend toward the vehicle rearward side and the vehicle width direction outer side from each of the two end portions of the laterally extending portion 70A. The door main body portion 24 is partitioned by the intended splitting portion 70 into a front side door portion 24C (a curvature direction one side door portion), a rear side door portion 24D (a curvature direction other side door portion), a right side door portion 24E and a left side door portion 24F.

Figure 7:
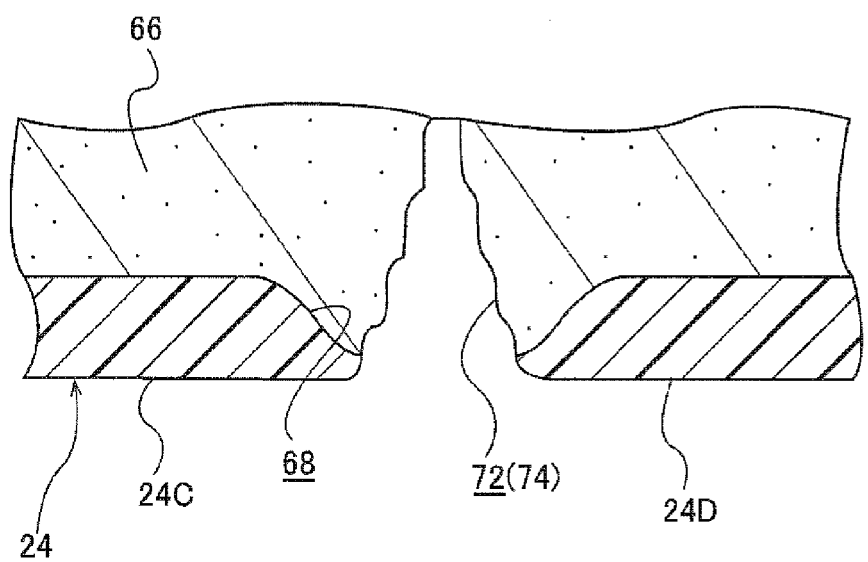
FIG. 7 is a magnified sectional view showing a magnification of a region marked with the reference symbol A in FIG. 6.

A pair of front and rear hinge portions 24G and 24H are formed at two curvature direction end portions of the door main body portion 24. A pair of left and right hinge portions 24I and 24J are formed at two vehicle width direction end portions of the door main body portion 24. In the instrument panel 10, as shown in FIG. 2, FIG. 3 and FIG. 6, an incision portion 72 (which is not shown in FIG. 4) is formed in the intended splitting portion 70 from the opposite side thereof from the side at which the cover layer 62 is provided. The incision portion 72 is incised with a depth that does not reach the surface of the skin 64. The incision portion 72 is formed as a plural number of perforations in rows (dotted lines) along the intended splitting portion 70. Thus, the incision portion 72 structures a tear line portion 74. The incision portion 72 is formed by laser machining, and is a structure at which a remaining thickness of the skin 64 is managed in accordance with transmitted amounts of laser light. That is, a plural number of the incision portion 72 are formed by laser light being irradiated from a laser oscillator 76 disposed at the rear face side of the door main body portion 24 toward a light detection sensor 78 disposed at the surface side of the skin 64, as shown in FIG. 6. Consequently, as shown in FIG. 7, the incision portion 72 is formed with a width dimension that is wider at the side closer to the laser oscillator 76 in the irradiation direction of the laser light (the lower side in FIG. 7) than at the further side (the upper side in FIG. 7), in accordance with the thermal energy of the laser light.

In the instrument panel 10 with the structure described above, when inflation pressure of the airbag 58 acts on the door main body portion 24, the door main body portion 24 splits open at the intended splitting portion 70 and the cover layer 62 splits open at the tear line portion 74. Thus, the front side door portion 24C, rear side door portion 24D, right side door portion 24E and left side door portion 24F open to the vehicle cabin 26 side thereof about the hinge portions 24G, 24H, 24I and 24J, respectively, and the aperture portion 20 of the base member 18 is opened up to the vehicle cabin 26 side thereof. Hence, the airbag 58 can inflate and expand to the vehicle cabin 26 side thereof.

Now, a procedure of fabrication when the instrument panel 10 with the structure described above is being fabricated is described.

In a first step, as shown in FIG. 8, the door main body portion 24 of the airbag door 16 is fixed by fastening to the base member 18, by the plural stud bolts 32 mounted at the metal plate member 30 and the plural nuts 40. This fastening is provisional fastening for formation of the urethane foam layer 66. Therefore, the plural nuts 40 do not all need to be screwed onto the plural stud bolts 32 of the metal plate member 30. For example, just the four corners of the door main body portion 24 may be fastened to the base member 18.

Figure 9:
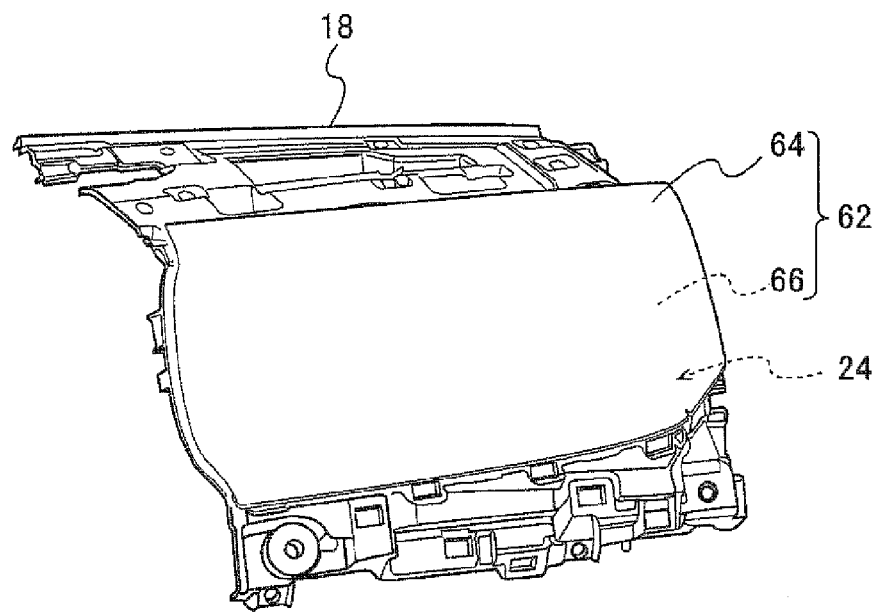
FIG. 9 is a perspective view for describing a second step of the fabrication procedure of the instrument panel integrally including an airbag door in accordance with the first exemplary embodiment of the present invention.
Figure 10:
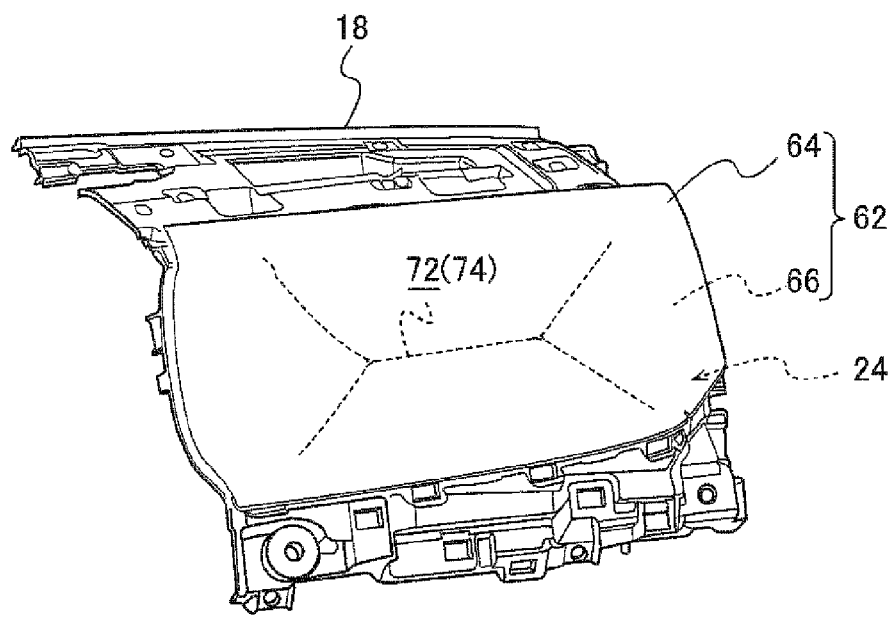
FIG. 10 is a perspective view for describing a third step of the fabrication procedure of the instrument panel integrally including an airbag door in accordance with the first exemplary embodiment of the present invention.
Figure 11:
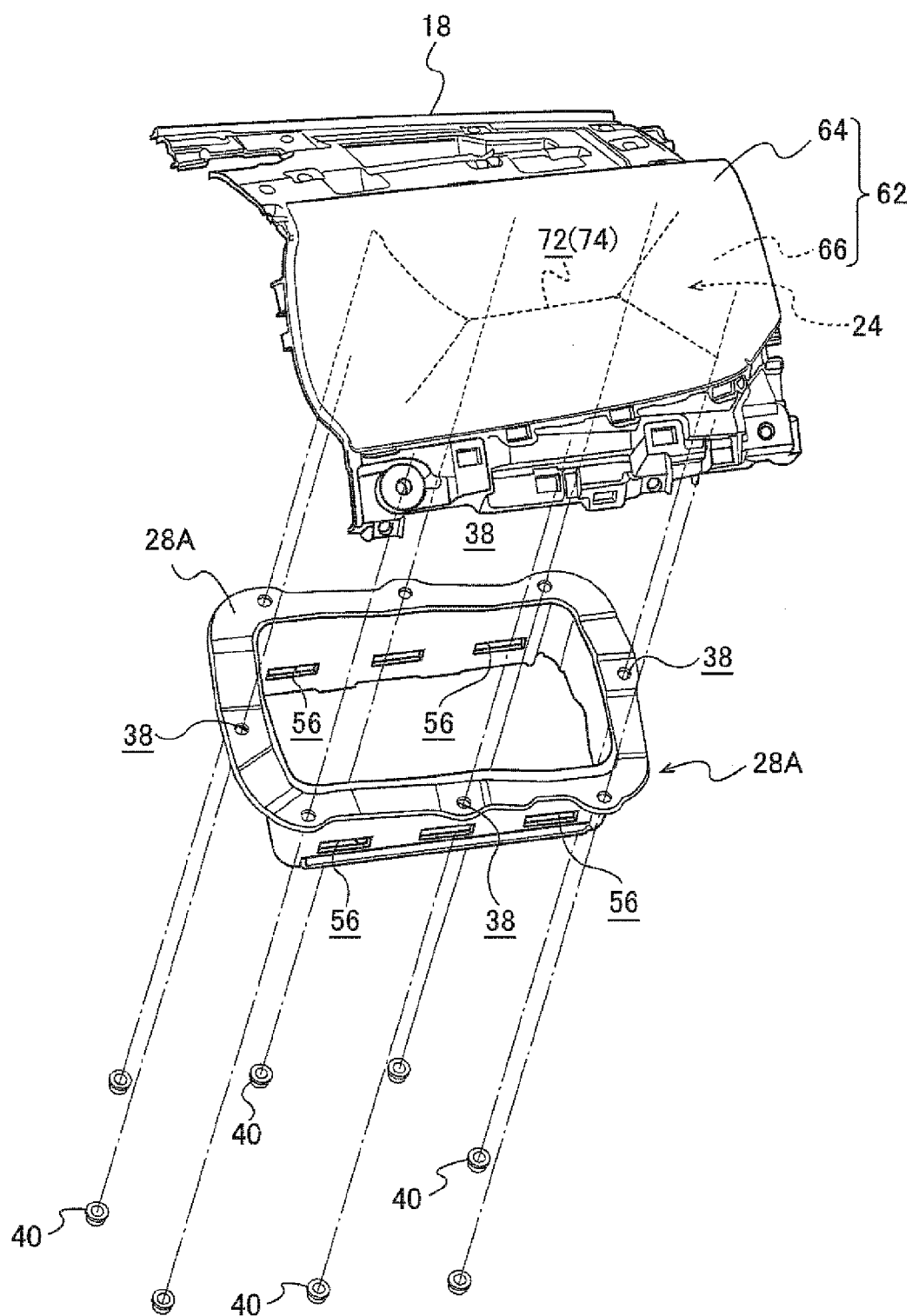
FIG. 11 is an exploded perspective view for describing a fourth step of the fabrication procedure of the instrument panel integrally including an airbag door in accordance with the first exemplary embodiment of the present invention.
Figure 12:
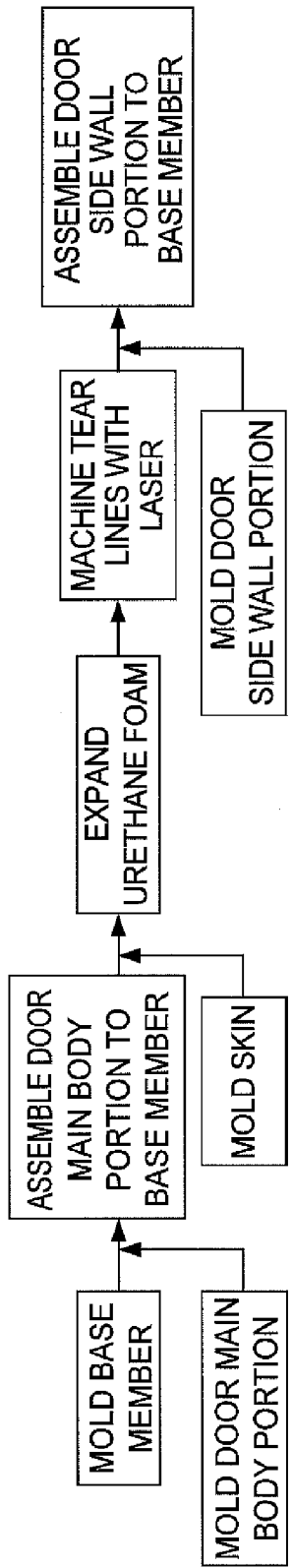
FIG. 12 is a flow diagram for describing the fabrication procedure of the instrument panel integrally including an airbag door in accordance with the first exemplary embodiment of the present invention.

In a second step, the skin 64, which is molded in a separate step, and the base member 18 to which the door main body portion 24 is fixed are set in a mold for foam molding of urethane foam, and foam molding of the urethane foam layer 66 is carried out (see FIG. 9). Subsequently, in a third step, the tear line portion 74 is formed by laser machining from the rear face side of the door main body portion 24 (see FIG. 10). In a fourth step, the nuts 40 of the above-mentioned provisional fastening are temporarily removed, and the door side wall portion 28 is fixed by fastening to the base member 18 and the door main body portion 24 with all of the plural nuts 40 and the plural stud bolts 32 (see FIG. 11). Although not shown in FIG. 11, in this fourth step the aforementioned reinforcement bracket 48 is fixed by fastening at the same time. FIG. 12 shows the above-described fabrication procedure in a flow diagram.

Next, operation and effects of the present exemplary embodiment are described.

In the instrument panel 10 with the structure described above, when the airbag 58 inflates due to the inflator 60 of the airbag module 52 operating, the inflation pressure of the airbag 58 acts on the door main body portion 24 of the airbag door 16. As a result, the intended splitting portion 70 of the door main body portion 24 splits together with the cover layer 62, and the front side door portion 24C, rear side door portion 24D, right side door portion 24E and left side door portion 24F specified in the door main body portion 24 open to the vehicle cabin 26 side about the hinge portions 24G, 24H, 24I and 24J, respectively. Thus, the aperture portion 20 of the base member 18 is opened up, and the airbag 58 inflates and expands through the aperture portion 20 to the vehicle cabin 26 side (the side at which a passenger seat that is not shown in the drawings is disposed).

The cross-sectional shape of the door main body portion 24 described above as viewed in the vehicle width direction is specified to be the recessed shape that curves so as to recess toward the lower side, and the door main body portion 24 is disposed to oppose the concave design surface 12 provided at the upper face of the instrument panel 10. Therefore, the concave design surface 12 may be concealed from the line of sight of a vehicle occupant, and a sense of spaciousness in the vehicle cabin 26 may be realized.

Furthermore, in the present exemplary embodiment, the groove portion 68 that forms the intended splitting portion 70 is formed at the cover layer 62 side (the vehicle cabin 26 side) of the door main body portion 24. Therefore, a decline in opening performance of the front side door portion 24C (the curvature direction one side door portion) and the rear side door portion 24D (the curvature direction other side door portion) may be avoided.

Figure 14:
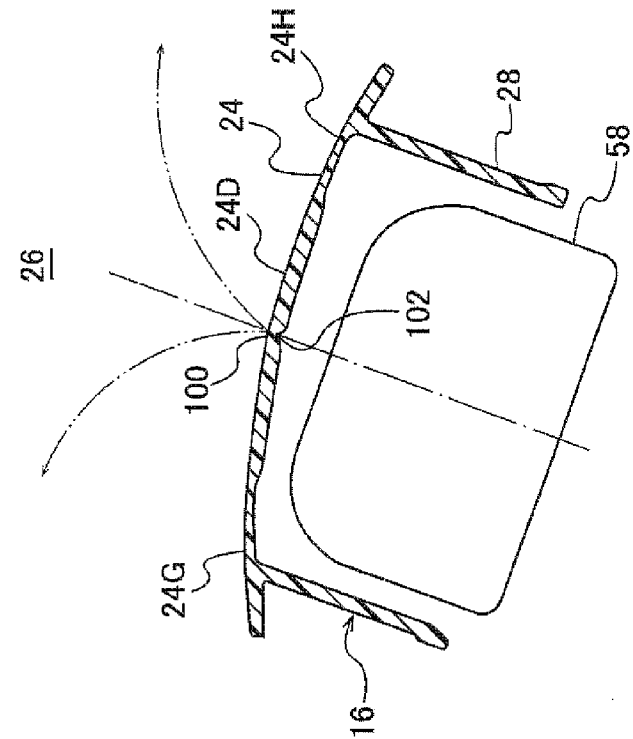
FIG. 14 is a sectional view showing a comparative example of an airbag door in accordance with the first exemplary embodiment of the present invention.

That is, if a groove portion 102 forming an intended splitting portion 100 is formed at the opposite side of the door main body portion 24 from the vehicle cabin 26 side thereof, as in the comparative example shown in FIG. 14, stress is concentrated at the intended splitting portion 100 when the door main body portion 24 is inverting from the recessed shape to the protruding shape due to the inflation pressure of the airbag 58. In consequence, if the intended splitting portion 70 splits before the door main body portion 24 has completely inverted to the protruding shape, opening paths of the front side door portion 24C and rear side door portion 24D connected via the intended splitting portion 70 interfere with one another (see the two-dot chain lines in FIG. 14). As a result, opening performance of the front side door portion 24C and rear side door portion 24D might decline.

Figure 15:
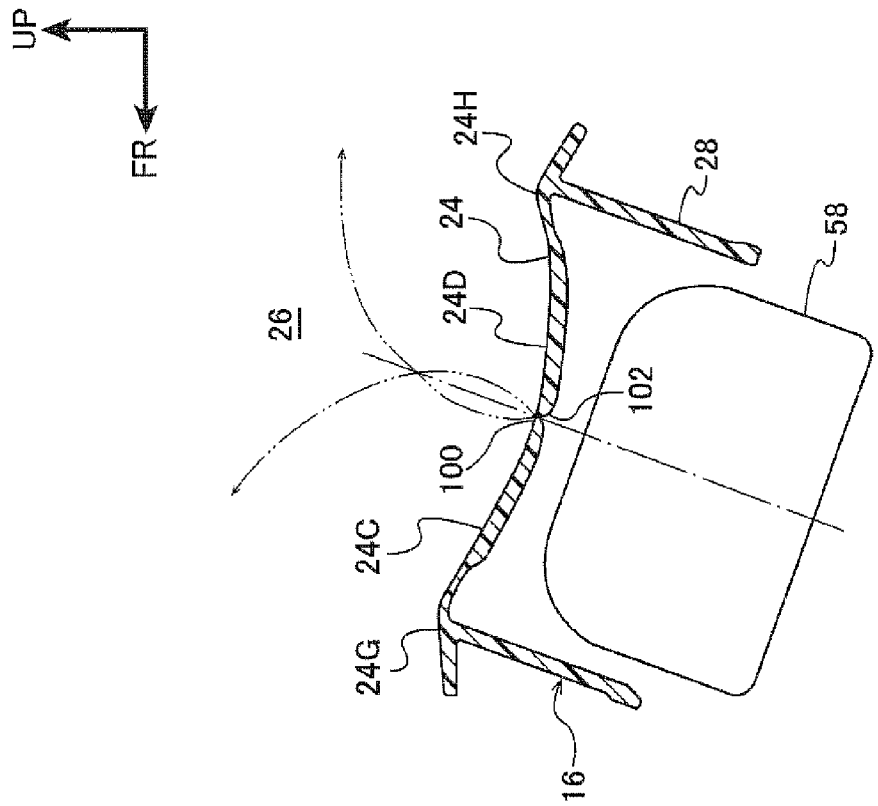
FIG. 15 is a sectional view showing a conventional ordinary airbag door.
Figure 16:
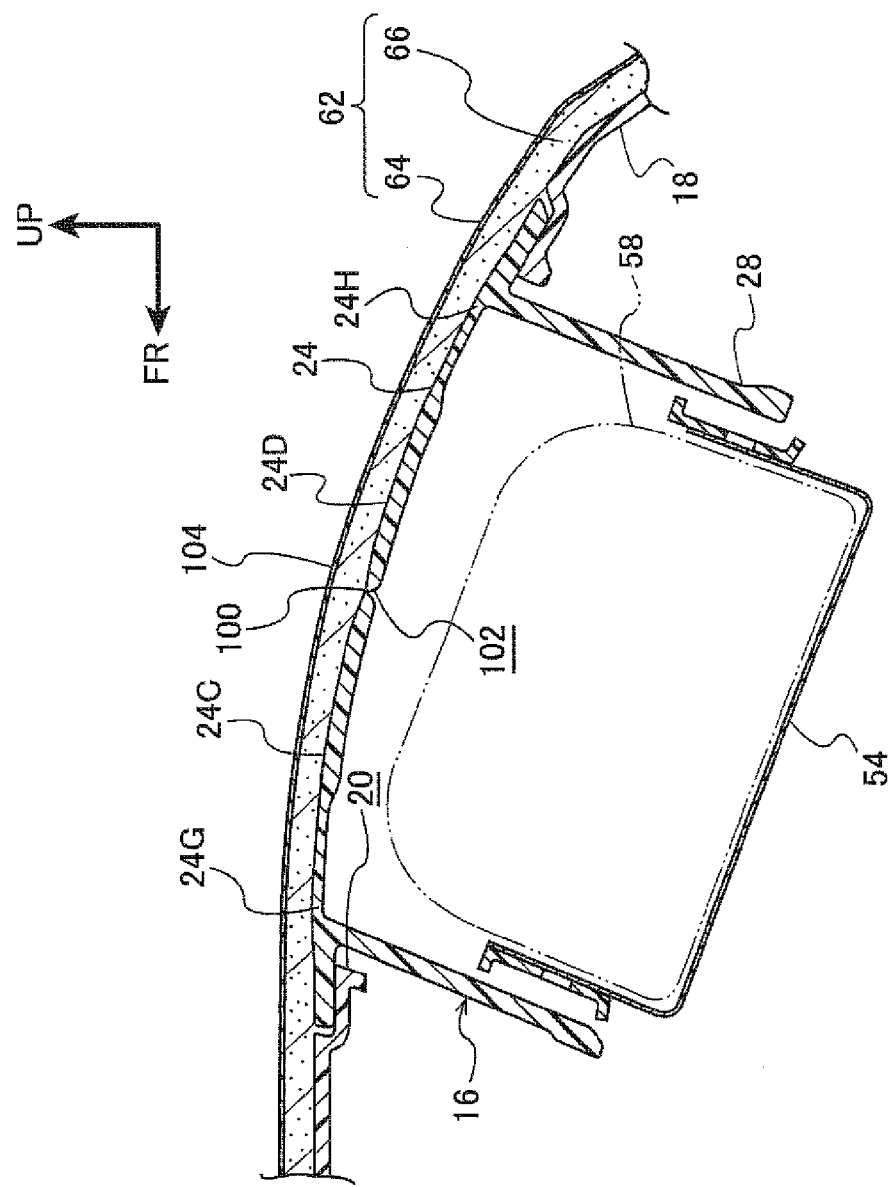
FIG. 16 is a sectional view of an instrument panel incorporating the airbag door shown in FIG. 15.

In order to avoid this decline in door opening performance, conventionally, the cross-sectional shape of the door main body portion 24 as viewed in the vehicle width direction would be specified to be a protruding shape that curves so as to protrude toward the upper side (the vehicle cabin side), as shown in FIG. 15. In this case, as shown by the two-dot chain lines in FIG. 15, the opening paths of the front side door portion 24C and rear side door portion 24C do not interfere. However, as shown in FIG. 16, in this case the design surface disposed to oppose the door main body portion 24 is limited to a convex design surface 104. Consequently, a degree of freedom of design is reduced (in FIG. 14 to FIG. 16, note that structures that are basically the same as in the present exemplary embodiment are assigned the same reference numerals as in the present exemplary embodiment).

Figure 17:
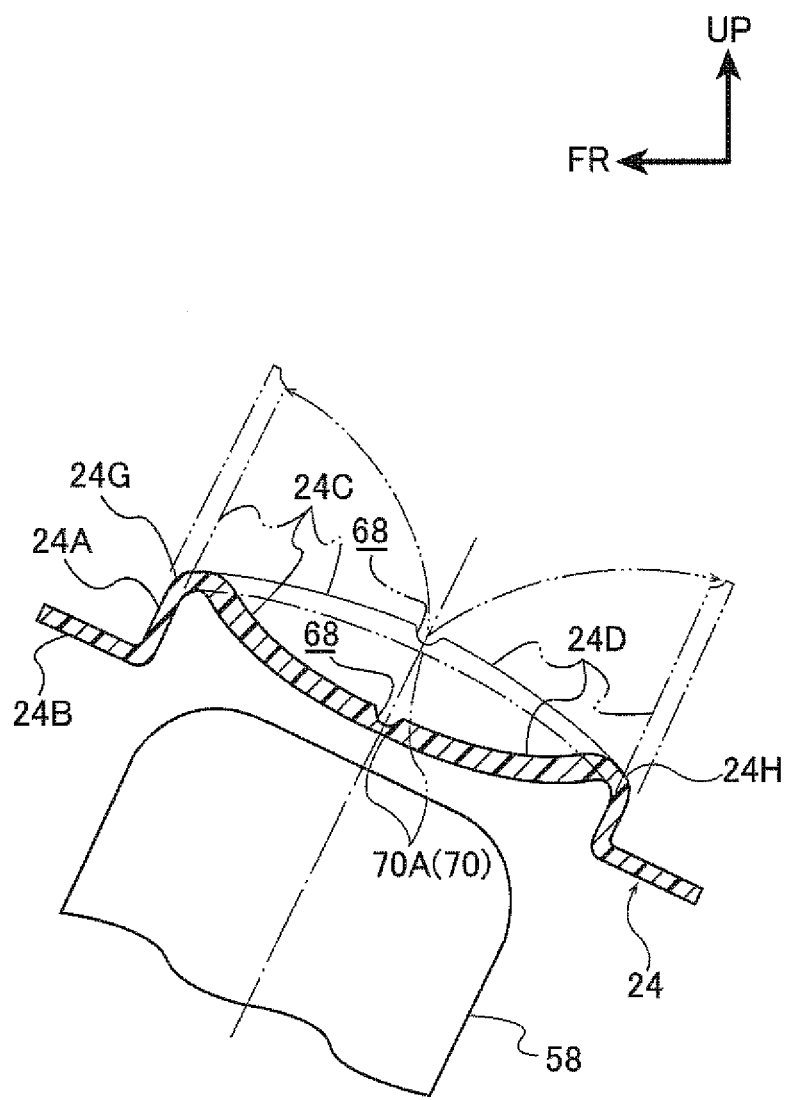
FIG. 17 is a sectional view showing the airbag door in accordance with the first exemplary embodiment of the present invention.

In contrast, in the present exemplary embodiment, the groove portion 68 that is formed at the vehicle cabin 26 side (the cover layer 62 side) of the door main body portion 24 is stretched in the curvature direction of the door main body portion 24 when the door main body portion 24 is inverting from the recessed shape to the protruding shape (see FIG. 17). Therefore, stress that arises at the intended splitting portion 70 may be dispersed, and splitting of the intended splitting portion 70 before the door main body portion 24 has fully inverted to the protruding shape may be prevented or effectively inhibited. Hence, unintended interference between the front side door portion 24C and the rear side door portion 24D may be prevented and the opening performance thereof may be made excellent. As a result, expansion performance of the airbag 58 may be improved. Thus, both an improvement in the degree of freedom of design of the concave design surface 12 and an assurance of airbag expansion performance may be achieved with a very simple structure.

Moreover, in the instrument panel 10 according to the present exemplary embodiment, the incision portion 72 is formed in the intended splitting portion 70 of the door main body portion 24 by being incised from the opposite side of the intended splitting portion 70 to the cover layer 62 side thereof, to a depth that does not reach the surface of the skin 64. Thus, when the airbag 58 is inflating, the intended splitting portion 70 and the cover layer 62 may be excellently split. Therefore, door opening performance and airbag expansion performance may be improved even further. Furthermore, because the incision portion 72 does not reach the surface of the skin 64 structuring the concave design surface 12, the external appearance quality of the concave design surface 12 may be made excellent.

This incision portion 72 is formed by laser machining. Therefore, the remaining thickness of the skin 64 may be managed with ease even after foam molding of the urethane foam layer 66 between the skin 64 and the base member 18 and door main body portion 24. Thus, the incision portion 72, which is to say the tear line portion 74, may be prevented from emerging at the concave design surface 12 side.

Figure 13:
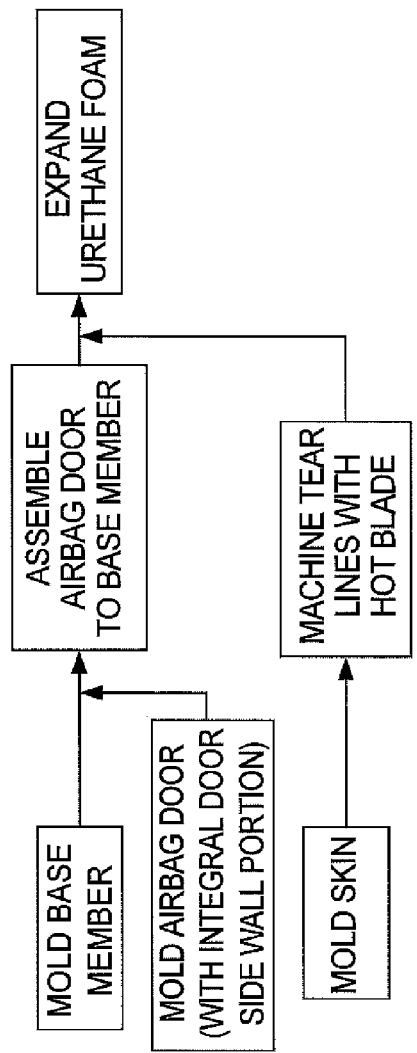
FIG. 13 is a flow diagram for describing a fabrication procedure of a conventional instrument panel integrally including an airbag door.
Figure 18:
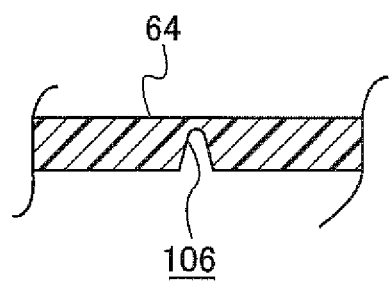
FIG. 18 is a sectional view of a skin in which an incision portion is formed by a hot blade.
Figure 19:
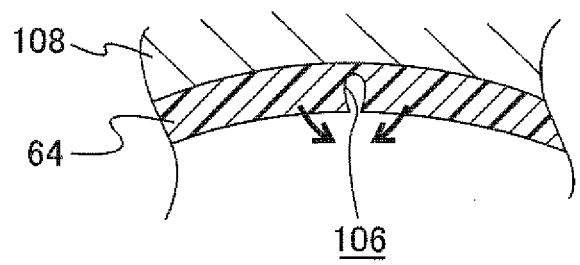
FIG. 19 is a sectional view showing a state in which the skin shown in FIG. 18 is set in a mold for foam molding of a urethane foam in accordance with a convex design surface.
Figure 20:
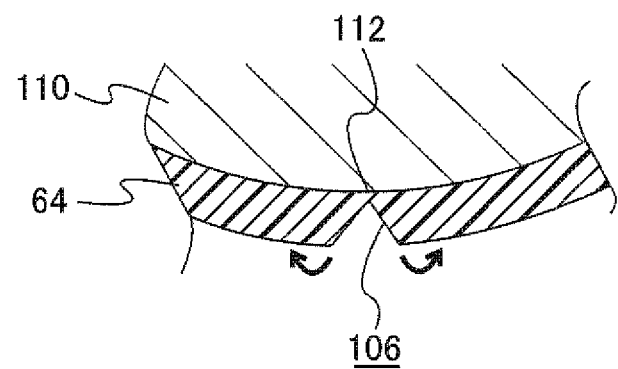
FIG. 20 is a sectional view showing a state in which the skin shown in FIG. 18 is set in a mold for foam molding of a urethane foam in accordance with a concave design surface.

That is, in a conventional fabrication procedure as illustrated in FIG. 13, an incision portion (a tear line portion) is formed in a skin using a hot blade before foam molding of a urethane foam layer. However, when the skin forms a concave design surface of an instrument panel, the incision portion may emerge at the concave design surface side. In other words, in a conventional fabrication procedure, an incision portion 106 is formed by a hot blade in the skin 64 that has been formed beforehand, as shown in FIG. 18, and this skin 64 is set in a mold for foam molding of the urethane foam. In this case, if a mold 108 corresponds to a convex design surface as shown in FIG. 19, the skin 64 is curved in a direction that reduces the width of the incision portion 106. Consequently, the formation of a fold line in the skin 64 along the incision portion 108 may be prevented. On the other hand, if a mold 110 corresponds to a concave design surface as shown in FIG. 20, the skin 64 is curved in a direction that increases the width of the incision portion 106. Consequently, a fold line 112 along the incision portion 106 may be formed at the surface side (the side at which the mold 110 is disposed) of the skin 64. Hence, there may be a problem with the external appearance of the surface of the skin 64 (the concave design surface). In the present exemplary embodiment, however, because laser machining is employed as mentioned above, the formation of a fold line may be prevented. Thus, both avoiding problems with the external appearance of the concave design surface 12 and assuring door opening performance may be achieved with ease.

In the present exemplary embodiment, the width of the incision portion 72 is widened more by thermal energy at the near side in the laser irradiation direction (the intended splitting portion 70 side) than at the far side (the skin 64 side). Therefore, unintended closing of the incision portion 72 while the cover layer 62 is inverting from the recessed shape to the protruding shape may be avoided or effectively suppressed. Thus, an unintended concentration of stress due to the incision portion 72 closing may be prevented from occurring.

The airbag door 16 according to the present exemplary embodiment includes the door side wall portion 28 that extends in a frame shape to the rear face side of the base member 18, and the module case 54 of the airbag module 52 is joined to this door side wall portion 28. Therefore, a reaction force that is inputted to the airbag module 52 during inflation and expansion of the airbag 58 may be excellently supported by the door side wall portion 28.

Figure 21:
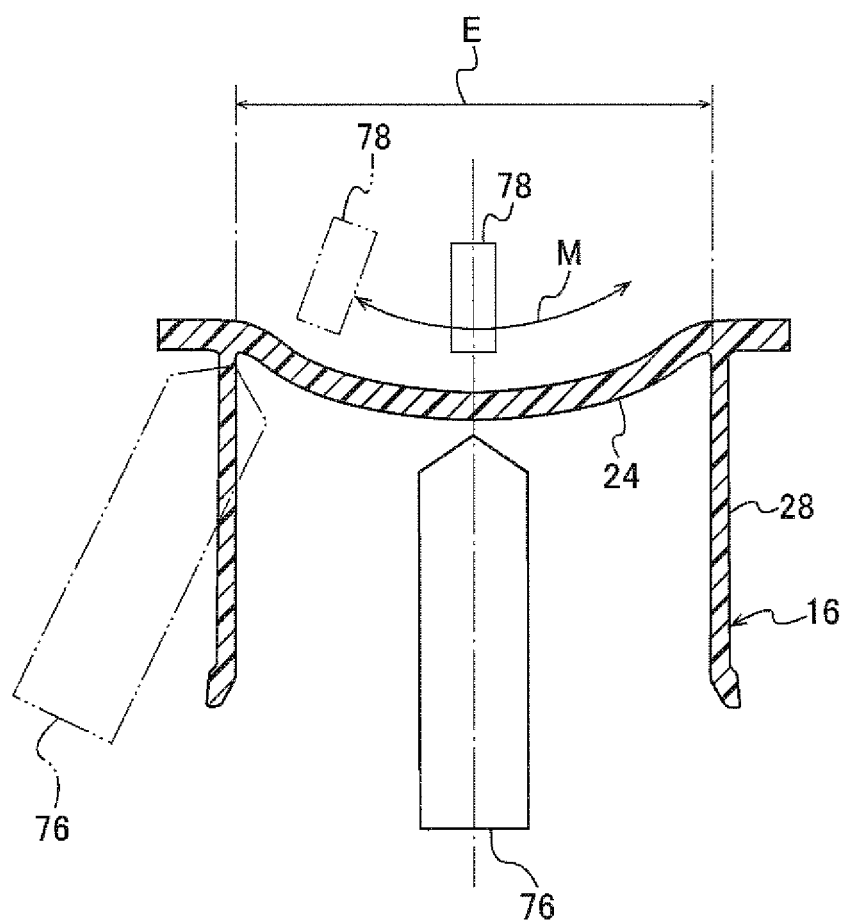
FIG. 21 is a sectional view for explaining the restriction of a range of specification of an incision portion (a tear line portion) by laser machining of an airbag door in which a door main body portion and a door side wall portion are formed integrally.
Figure 22:
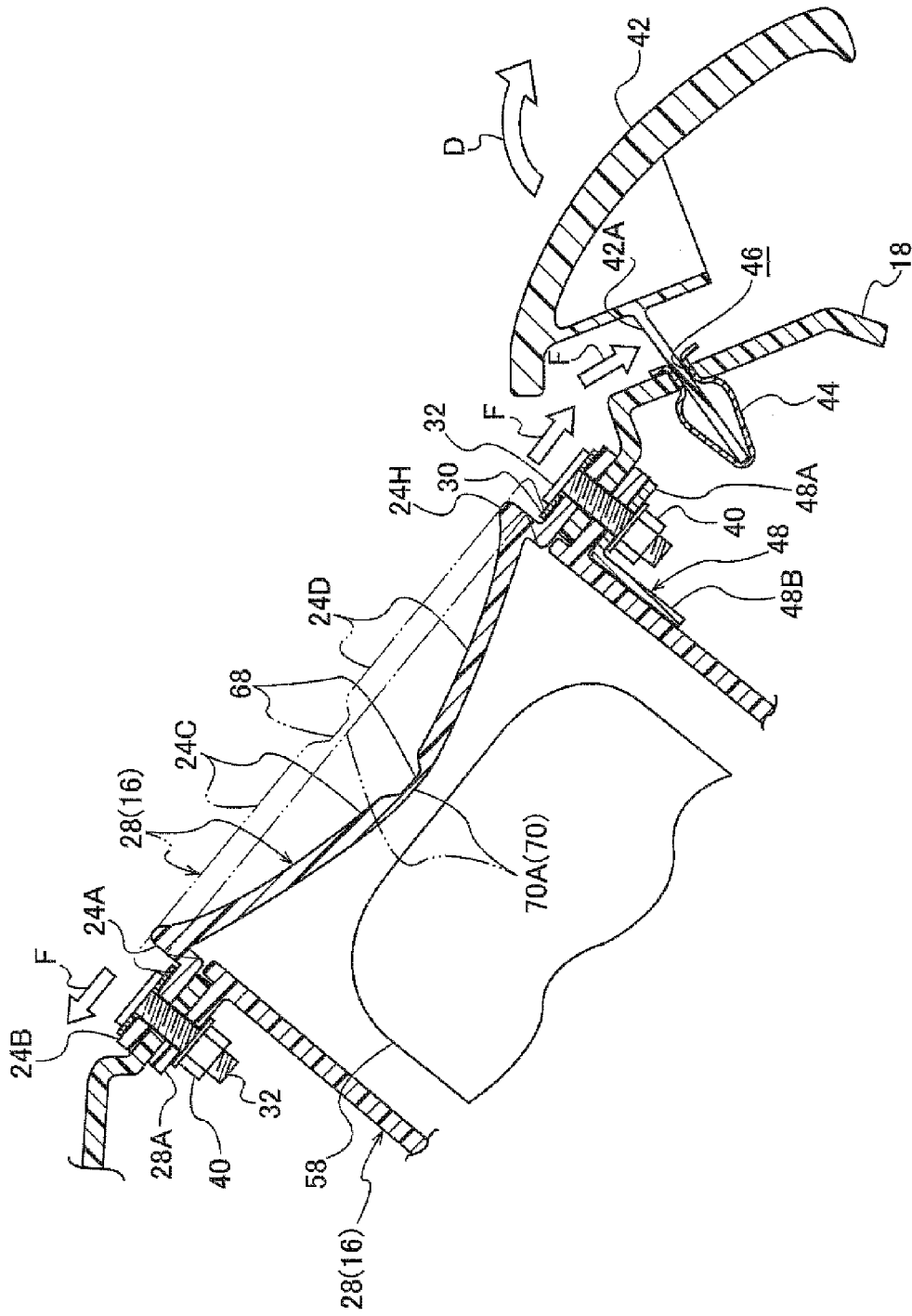
FIG. 22 is a sectional view for describing a state in which an external force acts on a base member when a door main body portion is inverting from a recessed shape to a protruding shape.

The door side wall portion 28 described above is formed as a separate body from the door main body portion 24 (the components are divided). Therefore, when the incision portion 72 is being formed by laser machining, because the laser machining is performed before the door side wall portion 28 is attached to the base member 18, a range of specification of the incision portion 72 may be assured of being wide. That is, if the door side wall portion 28 were formed integrally with the door main body portion 24 as illustrated in FIG. 21, a range of movement M of the laser oscillator 76 would be restricted by the door side wall portion 28, and thus the range of specification of the incision portion 72 would be restricted. That is, the range of specification of the incision portion 72 would be much narrower than the range E shown in FIG. 21. Hence, it would be difficult to improve the opening performance of the door portions 24C, 24D, 24E and 24F of the airbag door 16. In the present exemplary embodiment, however, the range of specification of the incision portion 72 may be broadened because of the structure described above, and this is excellent in regard to improving the opening performance of the door portions 24C, 24D, 24E and 24F.

Because the door main body portion 24 and the door side wall portion 28 are formed as separate bodies in the present exemplary embodiment, the resin materials of the door main body portion 24 and the door side wall portion 28 may be different. Therefore, the different characteristics required by the door main body portion 24 and the door side wall portion 28 may be respectively improved. That is, if the door main body portion 24 and the door side wall portion 28 were integrally formed, a soft resin material such as thermoplastic olefin (TPO) or the like would often be used as the material of the airbag door 16 (i.e., the door main body portion 24 and the door side wall portion 28). A reason for this is that, in the case of a structure in which the airbag door 16 and the module case 54 are joined by the hook-shaped anchoring portions 54A provided at the module case 54 (see FIG. 2) as in the present exemplary embodiment, the door side wall portion 28 must be stretched using resilient flexing deformation of the door side wall portion 28 during a joining operation. However, if the door side wall portion 28 (a retainer) is formed of a soft resin material, a phenomenon in which the opening end of the door side wall portion 28 greatly deforms during airbag expansion (which is known as the "fishmouth effect") may occur. In the present exemplary embodiment, given that the structure joining the door side wall portion 28 with the module case 54 is altered to a fastening or the like, the material of the door side wall portion 28 may be changed to a stiff resin material with a higher strength than TPO or the like. Thus, the above-mentioned fishmouth effect may be suppressed.

In the present exemplary embodiment, the main body side flange portion 24B provided at the door main body portion 24 and the side wall side flange portion 28A provided at the door side wall portion 28 are fixed by fastening to the base member 18 in the state in which the base member 18 is sandwiched between the main body side flange portion 24B and the side wall side flange portion 28A. Therefore, the base member 18 may be reinforced by the flange portions 24B and 28A, and deformation of the base member 18 during inflation and expansion of the airbag 58 may be suppressed.

In the present exemplary embodiment, the plural stud bolts 32 are mounted at the metal plate member 30 that is superposed with the main body side flange portion 24B at the opposite side thereof from the base member 18. Therefore, when the main body side flange portion 24B, the base member 18 and the side wall side flange portion 28A are being fixed by fastening, the plural stud bolts 32 may be treated as an integral body, and the operation of fixing by fastening may be made simple. In addition, because the surroundings of portions that are fixed by fastening are reinforced by the metal plate member 30, deformation of the base member 18 during inflation and expansion of the airbag 58 may be even more excellently suppressed.

In the present exemplary embodiment, the ornamental member 42 is disposed adjacent to the vehicle rearward side (curvature direction one side) of the door main body portion 24, and the ornamental member 42 is attached to the base member 18 by the clips 44. This is because, if the base member 18 around the clips 44 is permanently deformed by an input force when the door main body portion 24 is switching from the recessed shape to the protruding shape due to the inflation pressure of the airbag 58 (see the two-dot chain lines and arrow F in FIG. 22), the ornamental member 42 might detach from the base member 18 as shown by arrow D in FIG. 22 (note that the cover layer 62 is not shown in FIG. 22). However, in the present exemplary embodiment, the fastening portion 48A of the reinforcement bracket 48 is fixed by fastening to the base member 18 and the airbag door 16, at the side at which the airbag door 16 is disposed relative to the clips 44, and the reinforcement portion 48B extending from the fastening portion 48A abuts against the rear face of the door side wall portion 28. Therefore, deformation of the base member 18 may be effectively suppressed, and detachment of the ornamental member 42 as described above may be prevented.

Second Exemplary Embodiment

Next, a second exemplary embodiment of the present invention is described. Structures and operations that are basically the same as in the first exemplary embodiment are assigned the same reference numerals as in the first exemplary embodiment and are not described here.

Figure 23:
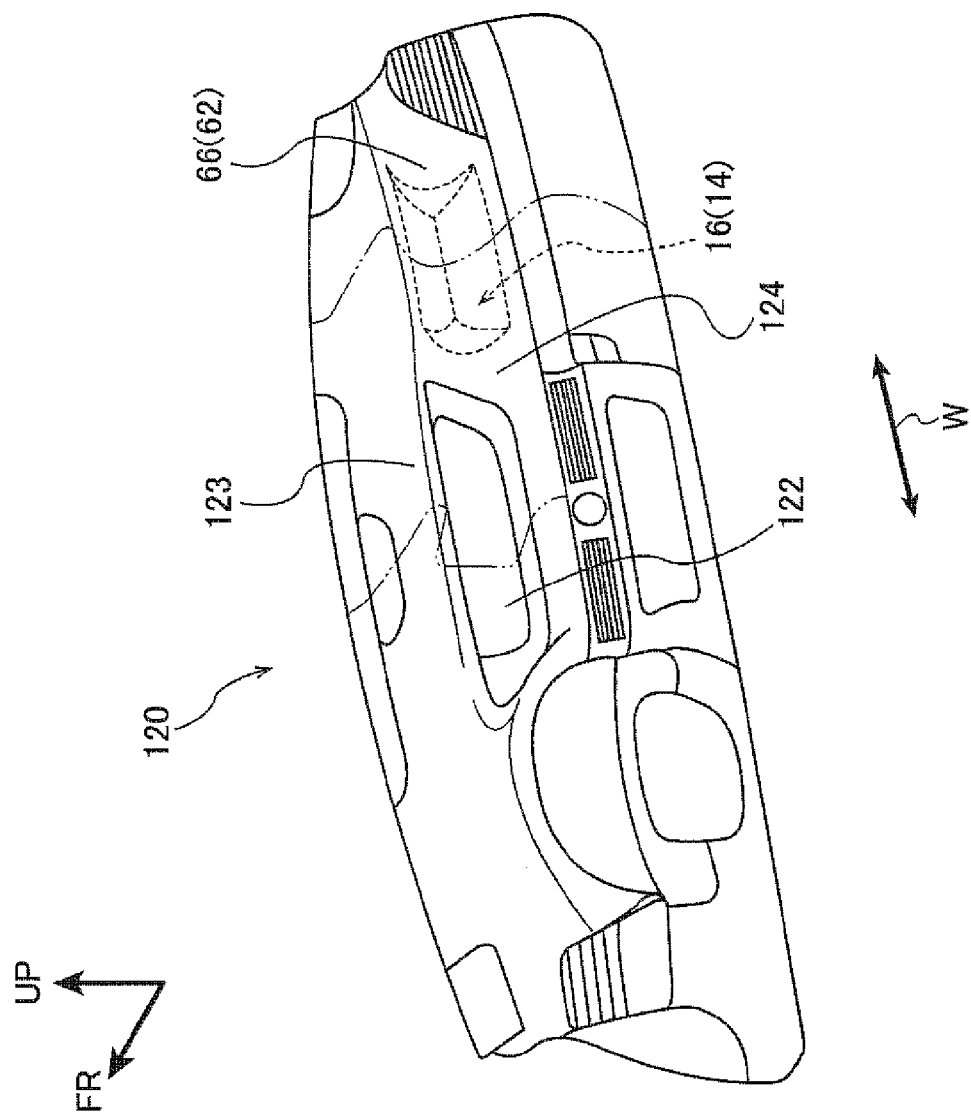
FIG. 23 is a perspective view of an instrument panel integrally including an airbag door in accordance with a second exemplary embodiment of the present invention.

FIG. 23 shows an instrument panel integrally including an airbag 120 in accordance with the second exemplary embodiment of the present invention in a perspective view. In the instrument panel 120, a display 122 is disposed at a vehicle width direction central portion, and a hood portion 123 is provided above the display 122. The hood portion 123 protrudes toward the vehicle rearward side. The hood portion 123 extends continuously to the passenger seat side (the vehicle rightward side in this case). A concave design surface 124 is formed at the vehicle rightward side of the display 122 (in front of the passenger seat). A cross-sectional shape of the concave design surface 124 as viewed in the vehicle width direction curves so as to recess toward the vehicle forward side (the opposite side from the vehicle cabin). The airbag door 16, with basically the same structure as the airbag door 16 according to the first exemplary embodiment, is incorporated in the instrument panel 120 at a portion opposing the concave design surface 124. The airbag door 16 is formed in a recessed shape that matches the concave design surface 124, and the cross-sectional shape of the airbag door 16 as viewed in the vehicle width direction is curved so as to recess toward the vehicle forward side (the opposite side from the vehicle cabin). In this exemplary embodiment, structures other than those described above are basically the same as in the first exemplary embodiment.

In this exemplary embodiment too, basically the same operations and effects as in the first exemplary embodiment are provided. In addition, because the concave design surface 124 is formed at the area of the instrument panel 120 at which the passenger seat airbag device 14 is mounted, a novel external appearance is expressed, and a sense of spaciousness in the vehicle cabin may be realized.

Supplementary Descriptions of the Exemplary Embodiments

Figure 24:
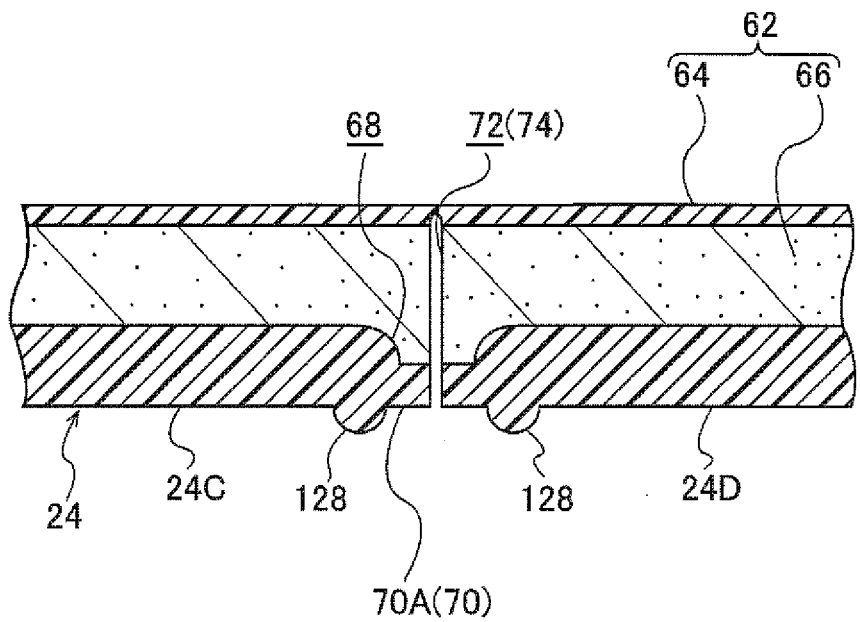
FIG. 24 is a sectional view showing a first variant example of the first and second exemplary embodiments of the present invention.

In the exemplary embodiments described above, the door main body portion 24 may have a structure in which ribs 128 are added at both sides of the intended splitting portion 70, as shown in FIG. 24. Thus, an input force at the intended splitting portion 70 during airbag inflation may be amplified, excellent splitting of the intended splitting portion 70 may be implemented, and door opening performance may be improved.

Figure 25:
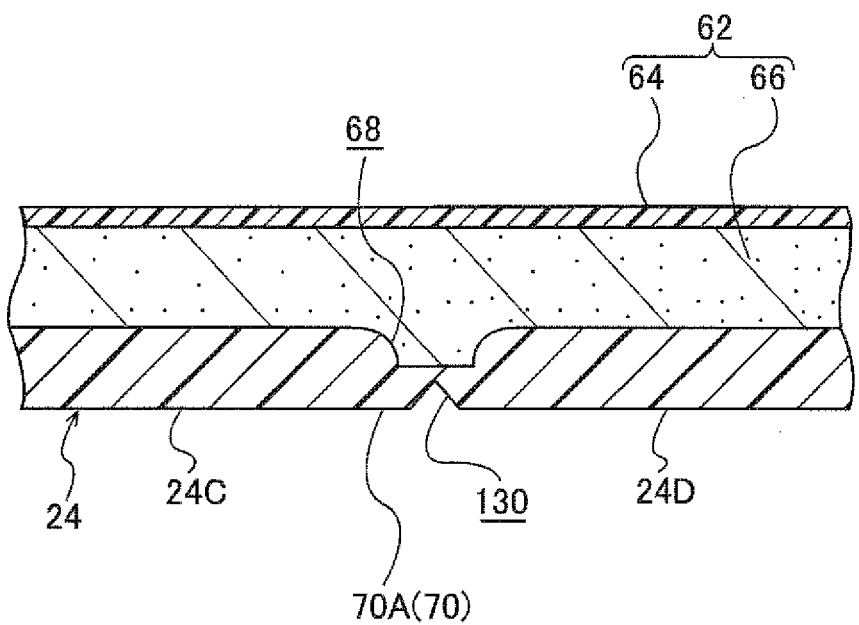
FIG. 25 is a sectional view showing a second variant example of the first and second exemplary embodiments of the present invention.

The exemplary embodiments described above have a structure in which the incision portion 72 is formed in the door main body portion 24 and the cover layer 62, but this is not limiting. Structures are possible in which the incision portion 72 is not provided, as illustrated in FIG. 25. In this structure, instead of the incision portion 72 being provided, a groove portion 130 with a "V" shape in cross section is added to the intended splitting portion 70 at the opposite side thereof from the side at which the cover layer 62 is disposed. With this structure too, excellent splitting of the intended splitting portion 70 may be implemented.

The exemplary embodiments described above have a structure in which the reinforcement bracket 48 is formed in an "L" shape in cross section, but this is not limiting. The cross-sectional shape of the reinforcement bracket 48 may be suitably modified. Furthermore, structures are possible in which the reinforcement bracket 48 is omitted.

The exemplary embodiments described above have a structure in which the plural stud bolts 32 are mounted at the metal plate member 30, but this is not limiting. Structures are possible in which the metal plate member 30 is omitted.

The exemplary embodiments described above have a structure in which the main body side flange portion 24B provided at the door main body portion 24 and the side wall side flange portion 28A provided at the door side wall portion 28 are fixed by fastening to the base member 18 in the state in which the base member 18 is sandwiched between the main body side flange portion 24B and the side wall side flange portion 28A, but this is not limiting. Structures are possible in which the door main body portion 24 and the door side wall portion 28 are separately fixed to the base member 18.

The exemplary embodiments described above have a structure in which the door side wall portion 28 and the door main body portion 24 are formed as separate bodies, but this is not limiting. If the incision portion 72 is omitted or the like (for example, with the structure shown in FIG. 25), structures are possible in which the door side wall portion 28 and the door main body portion 24 are formed integrally.

The exemplary embodiments described above have a structure in which the airbag door 16 is provided with the door side wall portion 28, but this is not limiting. Structures are possible in which the door side wall portion 28 is omitted.

The exemplary embodiments described above have a structure in which the incision portion 72 is formed by laser machining, but this is not limiting. A method of formation of the incision portion 72 may be suitably modified.

The exemplary embodiments described above have a structure in which the cover layer 62 is provided with the skin 64 and the urethane foam layer 66 (a foam layer), but this is not limiting. Structures are possible in which the foam layer is omitted.

The exemplary embodiments described above have a structure in which the door main body portion 24 is provided with the front side door portion 24C (the curvature direction one side door portion), the rear side door portion 24D (the curvature direction other side door portion), the right side door portion 24E and the left side door portion 24F, but this is not limiting. If an "H"-shaped intended splitting portion as recited in the disclosures of the related art is formed in the door main body portion 24, a structure is formed that omits the right side door portion 24E and the left side door portion 24F.

The exemplary embodiments described above have a structure in which the groove portion 68 is formed in a trapezoid shape in cross section, but this is not limiting. Structures are possible in which the groove portion is formed in other cross-sectional shapes, such as "V"-shaped cross-sectional shapes and the like. However, if the incision portion 72 is formed by laser machining, in view of scattering in the laser machining, it is preferable to form the intended splitting portion 70 in a flat shape.

It will be clear that numerous modes may be embodied within a scope that does not deviate from the gist of the present invention. It will also be clear that the scope of the present invention is not to be limited to the exemplary embodiments described above.

The invention claimed is:

1. An instrument panel integrally including an airbag door, comprising:
    a base member in which an aperture portion is formed;
    an airbag door that covers the aperture portion with a door main body portion that is attached to the base member, a cross-sectional shape of the door main body portion as viewed in a vehicle width direction being formed in a recessed shape that curves so as to recess toward the opposite side thereof from a vehicle cabin;
    a cover layer that is formed as a layer along surfaces of the base member and the door main body portion, the cover layer forming a concave design surface that curves so as to recess toward the opposite side thereof from the vehicle cabin;
    a pair of hinge portions formed at each of two curvature direction end sides of the door main body portion; and
    an intended splitting portion that is formed in a reduced thickness form in the door main body portion by a groove portion being formed at the side of the door main body portion at which the cover layer is provided, the intended splitting portion partitioning the door main body portion into at least a curvature direction one side door portion and a curvature direction other side door portion, and the intended splitting portion splitting together with the cover layer when the curvature direction one side door portion and the curvature direction other side door portion receive, from the opposite side thereof from the vehicle cabin, inflation pressure of an airbag and open toward the vehicle cabin side thereof about the pair of hinge portions.

2. The instrument panel integrally including an airbag door according to claim 1, wherein
    the cover layer includes a skin and a foam layer that is foam molded between the skin and the base member and door main body portion, and
    an incision portion is formed in the intended splitting portion, the incision portion being incised from the opposite side of the intended splitting portion from the side thereof at which the cover layer is provided, to a depth that does not reach a surface of the skin.

3. The instrument panel integrally including an airbag door according to claim 2, wherein the incision portion is formed by laser machining.

4. The instrument panel integrally including an airbag door according to claim 1, wherein the airbag door includes a door side wall portion that protrudes in a frame shape to a rear face side of the base member and to which a module case of an airbag module is joined.

5. The instrument panel integrally including an airbag door according to claim 4, wherein the door side wall portion is formed as a separate body from the door main body portion and is attached to the base member.

6. The instrument panel integrally including an airbag door according to claim 5, wherein a main body side flange portion is provided at the door main body portion, a side wall side flange portion is provided at the door side wall portion, and the main body side flange portion and the side wall side flange portion are fixed by fastening to the base member in a state in which the base member is sandwiched between the main body side flange portion and the side wall side flange portion.

7. The instrument panel integrally including an airbag door according to claim 6, further comprising a metal plate member that is superposed with the main body side flange portion at the opposite side thereof from the side at which the base member is disposed, wherein a plurality of stud bolts are mounted at the metal plate member, the plurality of stud bolts penetrating through the main body side flange portion, the base member and the side wall side flange portion and being screwed into a plurality of nuts.

8. The instrument panel integrally including an airbag door according to claim 4, further comprising:
an ornamental member that is disposed adjacent to the curvature direction one side relative to the door main body portion, and that is attached to the base member by a clip; and
a reinforcement bracket that is disposed abutting against a face of the door side wall portion at the side thereof at which the ornamental member is disposed, the reinforcement bracket being fixed by fastening to the base member and the airbag door.

* * * * *